US010617906B2

(12) United States Patent
Johnson

(10) Patent No.: US 10,617,906 B2
(45) Date of Patent: Apr. 14, 2020

(54) PATIENT AID DEVICES, PARTICULARLY FOR MOBILE UPPER EXTREMITY SUPPORT IN RAILED DEVICES SUCH AS PARALLEL BARS AND TREADMILLS

(71) Applicant: Cynthia Louise Johnson, Coupeville, WA (US)

(72) Inventor: Cynthia Louise Johnson, Coupeville, WA (US)

(73) Assignee: NEUROMOBILITY LLC, Coupeville, WA (US)

( * ) Notice: Subject to any disclaimer, the term of this patent is extended or adjusted under 35 U.S.C. 154(b) by 0 days.

(21) Appl. No.: 15/790,827

(22) Filed: Oct. 23, 2017

(65) Prior Publication Data

US 2018/0043202 A1 Feb. 15, 2018

Related U.S. Application Data

(63) Continuation of application No. 14/719,311, filed on May 21, 2015, now Pat. No. 9,795,825.

(60) Provisional application No. 62/001,353, filed on May 21, 2014, provisional application No. 62/043,807, filed on Aug. 29, 2014, provisional application No. 62/091,191, filed on Dec. 12, 2014.

(51) Int. Cl.

| | |
|---|---|
| ***F16M 11/00*** | (2006.01) |
| ***A63B 21/00*** | (2006.01) |
| ***A61H 3/04*** | (2006.01) |
| *A63B 71/00* | (2006.01) |
| *A63B 69/00* | (2006.01) |
| *A63B 22/02* | (2006.01) |
| *A63B 22/00* | (2006.01) |

(52) U.S. Cl.
CPC ............... *A63B 21/15* (2013.01); *A61H 3/04* (2013.01); *A63B 21/40* (2015.10); *A63B 21/4027* (2015.10); *A63B 21/4045* (2015.10); *A61H 2201/1638* (2013.01); *A63B 22/0235* (2013.01); *A63B 69/0064* (2013.01); *A63B 71/0009* (2013.01); *A63B 2022/0094* (2013.01)

(58) Field of Classification Search
CPC ........ A63B 21/40; A63B 21/1453; A61H 3/04
See application file for complete search history.

(56) References Cited

U.S. PATENT DOCUMENTS

| | | | | |
|---|---|---|---|---|
| 4,248,256 A | | 2/1981 | Thomas | |
| 4,529,194 A | * | 7/1985 | Haaheim .............. | A63B 21/012 482/70 |
| 4,748,994 A | | 6/1988 | Schultz et al. | |
| 5,044,355 A | * | 9/1991 | Reopelle ............ | A63B 23/0417 482/131 |
| 2,362,466 A | | 11/1994 | Carter | |

(Continued)

OTHER PUBLICATIONS www.chinesport.com, Chinesport General Catalogue, Edition 2013, STandGO system, pp. 236-255.

(Continued)

*Primary Examiner* — Amy J. Sterling
(74) *Attorney, Agent, or Firm* — Fay Sharpe LLP

(57) ABSTRACT

Patient aid devices and an associated method of supporting an upper extremity are described and include a mobile upper extremity support for the patient. A support assembly supports a first side of an upper body of the user for movement along a first rail. The support assembly also allows motion of a second side of an upper body relative to the first side.

14 Claims, 21 Drawing Sheets

(56) References Cited

U.S. PATENT DOCUMENTS

| | | | | |
|---|---|---|---|---|
| 5,407,406 | A | 4/1995 | Canela | |
| 5,499,955 | A | 3/1996 | Becker et al. | |
| 6,279,591 | B1 | 8/2001 | Obitts | |
| 7,998,043 | B2 | 8/2011 | Zhou et al. | |
| 8,137,250 | B1 | 3/2012 | Caban | |
| 9,022,397 | B1 | 5/2015 | Prettyman | |
| 9,795,825 | B2 * | 10/2017 | Johnson | A63B 21/1488 |
| 2009/0105050 | A1 * | 4/2009 | Mayo | A63B 21/06<br>482/70 |

OTHER PUBLICATIONS www.alibaba.com/product-detail/PARALLEL-WALKING-BAR ; Parallel Walking Bar Deluxe, 3 pp., May 29, 2015.

Suzanne Posey and David Pearce, Phys. Ther. 1983; 63:347-348, “Sliding Forearm Rest for Parallel Bars: Suggestion from the Field”, downloaded from http://ptjournal.apta.org by guest on Oct. 3, 2014.

H/p/cosmos, “Treadmill therapy, early start of therapy with body weight support”, date unkown.

* cited by examiner

PATIENT AID DEVICES, PARTICULARLY FOR MOBILE UPPER EXTREMITY SUPPORT IN RAILED DEVICES SUCH AS PARALLEL BARS AND TREADMILLS

This application is a continuation application of U.S. Ser. No. 14/719,311, filed May 21, 2015 (now allowed U.S. Pat. No. 9,795,825, Issue Date Oct. 24, 2017), which claimed the priority benefit of U.S. provisional application Ser. No. 62/001,353, filed May 21, 2014, U.S. provisional application Ser. No. 62/043,807, filed Aug. 29, 2014, and U.S. provisional application Ser. No. 62/091,191, filed Dec. 12, 2014, the disclosures of each of which are expressly incorporated herein by reference.

BACKGROUND

The present disclosure relates to apparatus/assembly and related methods of training and exercise such as for rehabilitation and other medical, sports, fitness settings where upper extremity support is provided by a mechanism other than gripping both rails of devices such as parallel bars and treadmills, and enablement or enhancement of upper extremity (UE) support and/or movement while using these devices is desired. Of course, selected aspects may find use in related applications.

Patient mobility aids are known for assisting with ambulatory support. The amount of support offered varies among the various assistive devices. Walkers are commonly used patient aid devices which provide ambulatory support for physically challenged individuals. Walkers typically are 3-sided, having four legs, two legs on each side. The front legs are connected with a frame structure, and the front and rear legs are also connected on each side, respectively, with frame structures, creating side frames. Upper surfaces of the lateral frames are typically provided with a surface which can be gripped by a patient, and the height of walkers can be adjusted for optimal grip support height. Standard or swivel wheels can be alternately attached to the front legs of the walker in place of the non-slip or rubber tipped post legs to create a front-wheeled walker. A walker with four rubber-tipped legs is a pick up walker. A rollator is another patient aid device which is a four-wheeled device with caster wheels in the front, standard wheels in the rear, a braking mechanism, and typically a seat. Other mobility aids include crutches, canes, Lofstrand (forearm) crutches, hemi-walkers, among others.

When one cannot support oneself or manage the device by gripping a walker or rollator and using the upper limb for support for any of several reasons, including but not limited to decreased grip, pain, weakness, weight-bearing or other orthopedic restrictions, other injury, movement precautions, or if additional postural support is desired, one of various makes/models of platform attachments can be secured to one or both lateral frames of the patient aid device, offering a way to balance and support the body to the degree desired as well as to protect an upper limb if this is needed. Platform support also provides for a way to achieve increased weight-bearing symmetry, throughout a weakened side of the body during ambulation, such as occurs with stroke. Platform use is also desirable in cases in which greater support is needed on the side opposite a dysfunctional lower limb during gait training, to support the lower limb, as the contralateral upper limb mechanically provides the support. At times, immobilization/protection of the UE is needed and the platform accomplishes this. The platform assembly also offers a way to manipulate or manage the walker/rollator when the user is unable to manage the walker by gripping the grip(s). Platforms are sometimes used unilaterally or bilaterally when excessive upper body, lower body, and/or generalized weakness exists and the arms cannot safely support the body by transmitting weight through the hand(s). Walker platforms may be needed simply when distal UE dysfunction exists, such as with poor gripping function. In these cases, unfortunately, the entire UE is necessarily immobilized on the platform. Alternate upper extremity support surfaces beyond forearm platforms, for use with walkers and other mobility aids, largely do not exist. Known platform attachments are presently only available for use with walkers or rollators with attachment mechanisms particularly designed for these patient aid devices.

For individuals who need the support of a patient aid device such as a platformed walker such as those who have suffered a stroke, yet cannot mobilize with this device due to an inability to adequately manage a platformed walker, such individuals can sometimes alternately use a hemi-walker. A hemi-walker is a large based, four-legged device held by the strong hand. The weak upper extremity hangs or rests, devoid of support or stimulation during walking, which negatively affects gait training efforts in several regards. Indeed, rehabilitative efforts to the upper extremities during functional training such as gait training is often lacking as evidenced by techniques incorporated with currently available assistive devices/mobility aids, and/or mechanical limitations imposed by these devices. Mobility aids are lacking which facilitate endeavors to normalize gait. Device(s) which would enable a sound upper limb to mobilize a weak upper limb during the functional activity of ambulation also are unavailable and significantly needed.

The user's hands remain stationary on handgrips, and/or forearms remain stationary on platform supports, when mobilizing with a walker. If the walker is advanced forward, both upper extremities advance in phase and simultaneously, often too far ahead of the rest of the body, resulting in a flexed or forward bent posture, regardless of gait pattern used. "Reciprocating" walkers exist, yet good bilateral (UE) function is required to use this kind of walker (as opposed to a standard rigid framed walker) as each side must sequentially be advanced forward (to the extent that the device's design allows), and significant risk for postural faults remains. In terms of wheel selection, swivel wheels are often needed in order for individuals to be able to turn with a platformed walker; however, those who need this functionality the most, are at greatest risk with walking with such a device due to its inherent instability. Hence, functionality of platformed patient aid devices is often somewhat lacking in effectiveness in current commercially available products, particularly in terms of use with individuals afflicted with neurologic disease. There are also expensive wheeled devices with integrated upper body support, for overground walking, some of which are equipped with a posterior seating mechanism to further safeguard against falls. The upper body is platform-supported and generally immobile when these devices are used. Consequently, a need exists for enablement of arm movement with a walker regardless of whether one arm is weak.

The positioning and stabilization of the arms when a rigid framed walker is used is in contrast to a normal human gait during which, in all but slow velocities, the arms move out of phase, each advancing with the contralateral lower extremity, creating a reciprocating gait pattern. Physiologically, physically, and neurologically, it is well known that arm movement during walking is advantageous. Neural coupling is the term which denotes the favorable neurologic effect that arm movement has on the neurologic function of the lower extremities, especially important to those recovering from injury to the nervous system for example. Patient aid devices are needed which address the need for mechanisms to enable and facilitate physiologically normal upper body movement during gait.

In the field of physical rehabilitation, parallel bars refer to an ambulatory assistive device which offers significant stable support and is often the site of initial gait training, typically followed by progression to use of another less-restrictive assistive device. Prosthetists, orthotists, occupational therapists and other professionals also use parallel bars for ambulation and other lower extremity weight bearing activities. Parallel bar units include two parallel rails, typically 10 to 15 feet in length, which are often height and width adjustable, manually or electrically. It is recognized that other lengths may be contemplated. Indeed, very short parallel bar units are available and would be ideally suited for edge of bed and household use. Each rail is secured to two or more longitudinally spaced vertical posts with one of a variety of known connection devices/methods, and thence to the floor or walking platform. The patient uses of one's arms for supportive purposes while walking within the confines of the rails by sequentially gripping and releasing one or both rails while walking. The resulting upper extremity movement is largely in the sagittal plane as opposed to including some movement in the transverse plane as occurs when arm swinging occurs naturally and more shoulder rotation occurs. If one is able to turn at the end of the walkway, one can move hands from one rail to the other, and thence continue walking in a face forward direction in the reverse or opposite direction. A wheelchair is sometimes pushed behind a patient within the bars, for safety purposes. Parallel bars can also be used as a stable environment for initial gait training with one or two canes or crutches, as one can grab one or both rails as needed if one needs additional support.

Currently, a device which provides unilateral forearm platform support—mobile or stationary—for use in railed environments is not available. Hence, in cases in which forearm platform support is needed as well as the stability afforded by parallel bars, the technique used is as follows: a walker (pick up or wheeled) with a platform attachment is placed within the confines of the parallel bars. Hence, two assistive devices instead of preferably one, is being used to perform the training. The resultant technique is potentially unsafe, inefficient, cumbersome, and not as therapeutically effective. The rail is gripped with one hand while the involved upper extremity is placed on the forearm platform, or the uninvolved hand grips the walker grip, and the parallel bar can be grabbed if needed for safety. As the patient walks, the patient sequentially grips the rail on one side, and the walker is advanced as the patient takes steps. As such, the upper extremities are able to move minimally independently of each other (unlike when the patient progresses to platformed walker use outside of the parallel bars and both UEs move simultaneously as they are affixed to the walker grip platform), yet the involved UE is largely immobilized which may be desirable in cases of orthopedic injury but which is not desirable in terms of neurologic rehab. Later, when the patient walks outside of the parallel bars using a platformed walker, it can be confusing to some patients to grip the walker grip as opposed to the rail, while the other arm rests on the platform. A mechanism to practice the same technique which will eventually be used with a platformed walker would be desirable, as well as a mechanism which enables rehabilitation of the UE and gait training in ways which cannot be accomplished with a walker. For those needing bilateral platform support, a bilaterally-platformed walker can also be placed within the confines of parallel bars, for added security of availability of rail(s) to grab if needed.

Other techniques for unilateral UE support include physical assist by a clinician, supporting the UE in a sling, walking with insufficient UE support and/or asymmetric gait and posture, placing a crutch in cases such as UE amputation when residual limb strength is adequate, or using hemiplegic bars which necessitate only unilateral UE function yet thereby does not offer the therapeutic advantages of bilateral UE support needed by many recovering from neurologic injury. Use of a walker with platform attachment(s) may be the only safe/effective option, thereby precluding use of the parallel bars. With neurological rehabilitation techniques incorporating body weight support technologies, if the patient can not actively engage in free reciprocating movement of the arms and/or use one or both upper extremities for support purposes, a. the involved UE(s) are either strapped statically to rails as in the case of treadmill use, or left to dependently hang; b. overground training is done exclusively outside of the parallel bars which otherwise offer therapeutically-enhancing functionality to the rehab program. Bilateral forearm support can be accomplished with Midland parallel bar glider, yet this device promotes poor posture, is unsafe without braking/resistance components, and is functional unidirectionally.

A patient necessarily releases support of one rail at a time in order to advance and, as such, parallel bars do not offer the continuous support to the patient that walkers afford. This alternating temporary release of UE support can be problematic when significant upper body support is required in order to take steps as in the case of significant weakness and difficulty walking as with incomplete spinal cord injuries, which includes cases truly requiring forearm support for adequate bodily support as well as other cases which are in need for forearm support when gripping function is nonexistent or unsafe. A method to provide continuous support when needed would be desirable. Upper extremity force measurement capabilities would also be desirable and the devices proposed herein could accommodate such upon further development. In cases in which parallel bars (and treadmills) are utilized to work on the components of normal gait, arm swinging cannot be mechanically facilitated or measured in any way, and symmetry of upper extremity excursion distance and velocity cannot be effectively addressed. Symmetry in terms of arm swing magnitude and velocity is preferable during gait training as is the capability to work on coordination between upper extremities and lower extremities. Conversely, independent movement of the UEs, if appropriate and if achieved, in parallel bars, is lost upon progression to use of a walker, unfortunately. Hence, devices to work on such in railed environments are very much needed. It must be noted that rehabilitation goals may not include enabling or increasing back and forth movement of the UE while the forearm support is in use for several different reasons. In these cases, the UE may remain largely fixed in position relative to the body, while the person walks on these devices. Also, while working on these devices, a stationary, stable support is sometimes desirable as is mobile support bilaterally to use while walking or standing in place as a way to do work on arm swinging motions, and on the associated trunk rotation. In parallel bars, if a patient can grip the rail yet has difficulty advancing the UE, there currently is not an apparatus available to mechanically facilitate movement.

A significant issue related to rehabilitative efforts is that higher intensities of aerobic exercise are needed. This could be accomplished in railed devices such as parallel bars and on treadmills by offering a method to enable mobile grip or mobile forearm platform support. Upper extremity movement adds to the aerobic stimulus. Greater intensities could also be achieved by the addition of bodily and postural support offered by forearm platforms.

Mobility aids are needed by amputees who have both an UE and a lower extremity (LE) amputation for initial training in parallel bars, both in terms of provision of a means of UE support for the lower extremity(ies), as well as for early weight bearing through, and functional use of, the involved UE during the functional task of walking. Below elbow amputees need a forearm platform support or a method to connect the residual limb to an alternate support surface. Above elbow amputees need a mechanism to enable support via a forearm support surface. Adequate weight-bearing support for early ambulation is needed, as well as UE functional training which could both neurologically facilitate LE recovery as well as result in increased likelihood of long term UE prosthesis use.

Generalized upper body weakness in those with lower extremity pathology/dysfunction often presents a fall hazard during gait training with walkers and in these cases, forearm platforms are used. An obvious need for unilateral or bilateral forearm platform support in parallel bars exists for this same reason, particularly as parallel bars are used when greater difficulty with walking exists.

One type of parallel bar unit is called "hemiplegic bars" designed for those patients such as those afflicted with hemiplegia who are able to grip and support their body weight while walking with only one UE. As opposed to two parallel bars which are not attached at the ends, this unit has a continuous, oblong-shaped railing. A patient can walk continuously around the device by hanging onto the railing with the stronger/unaffected upper extremity. The resultant gait pattern is similar to that used with a hemiwalker. The weak upper limb is not therapeutically stimulated during gait training with this assistive device unless manually, laboriously assisted by additional rehabilitation personnel. Therapists' access to a patient is enhanced with hemiplegic bars as compared to standard parallel bars. Another mechanism to therapeutically stimulate the UE during functional weight bearing activities is needed.

Locomotor training refers to the rehabilitative approach used for persons with neurologic dysfunction, and includes gait training on a treadmill (with rails available), in parallel bars, and overground with or without an assistive device with body weight support, as well as eventually overground with the least restrictive assistive device. During locomotor training, the patient grabs the device railings in a stationary manner, or variably, the arms hang freely and rhythmic arm movement occurs to the extent the individual is able to perform such arm movement independently or with verbal cuing. Sometimes the patient grabs pole(s) and while holding parallel to the ground, movement of the arms can be facilitated by the therapist. Often used during locomotor training are expensive body weight support systems which provide sling suspension for over ground, treadmill, or parallel bar gait training as a way to facilitate ambulation. Expensive robotic exoskeletons also exist for support and movement of the lower limbs. Specific UE robotic training to date typically involves arm movements occurring during tasks other than the functional task of ambulating. An inexpensive form of functional UE robotics is proposed herein as the reciprocating and reverse motion linkages could be mechanized. There currently are not alternate support surfaces for the upper extremit(ies) on these devices, nor is there a mechanism to facilitate arm movement as would be desirable as an important component of locomotor training. Locomotor training principles include providing for maximal sustainable loads on the lower extremities, maintaining erect head and neck and trunk posture, avoiding weight bearing on the arms and facilitating reciprocal arm swing, among others. High volumes of receptive movements of the arms and legs in functionally-meaningful movement patterns is desirable. As such, in cases of locomotor training when one may have tendency to excessively weight bear through the arms when gripping the rail, platform support may be beneficial in this respect as it is thought that when attempting to minimize UE weight-bearing, it may be easier to do so when forearm support instead of rail gripping is done. Gripping (nonweight-bearing) has been found to be neurologically-enhancing, so incorporation thereof is desirable, and a grip handle is indeed available on a forearm platform assembly which will be beneficial in this regard. A way to continue this repetitive movement therapy in a home setting following therapy would be desirable. Many treadmills already exist in facilities and homes, in need of attachable devices to enhance usage, safety, and functionality, particularly by neurologic patients in order to continue training in the home which was initiated in the clinic. Resting the UEs on supports which enable repetitive reciprocating arm movements, and hence continuing to perform training in railed environments which enable a mechanical means to do so, may be beneficial as opposed to allowing the UEs to hang freely during neurologic rehab, among other types of rehab. Whereas in current neurologic rehabilitation the emphasis is on avoiding weight-bearing through the upper extremities, including training in stepping and ambulation activities, utilizing forearm platform support and instructing in incremental UE weight-bearing using such could facilitate continuation of rehabilitation efforts outside of the clinic with railed devices, such as in the home, for cases in which this could be done safely. The same technique (s) could be continued with a novel walker which provides for similar functionality.

Treadmills are often used for gait training and for exercise training purposes in rehabilitation and other medical, sports, and fitness settings. Many different designs exist, with variable rail location, rail diameter, rail length, etc. Indeed, some treadmill railings, unlike parallel bar railings, do not have a circular cross-section but instead may be one of a variety of different shapes. If upper body support is needed while walking/running on a treadmill, one must hang on to the railing. There currently does not exist a device which enables mobile UE support on a treadmill when one is able to grip the rail such as would be therapeutic for some neurologic patients as well as for healthy individuals requiring support yet wishing to move the arms while using a treadmill. Rail support is available on the front and often along the sides of the treadmill. The upper body is stationary and effectively immobilized when one hangs onto rails and the upper extremities are fixed anteriorly or at one's sides, and disadvantageous excessive weight bearing through the UEs can result. There is currently no apparatus available to provide mobile or stationary unilateral or bilateral forearm support on treadmills when one requires this type of support for reasons noted above. If an individual is able to walk, jog, or run on a treadmill without hanging onto a rail, either independently or as a result of being mechanically supported such as by a sling support mechanism, or robotics exoskeleton, a mechanical device to facilitate upper extremity movement for strengthening or other neurological or functional reasons does not exist. Typically, if one has unilateral UE involvement such that one can support oneself with only one UE, yet remains able to ambulate on a treadmill, the involved UE remains unsupported, unstimulated, and non-functional, and unable to provide necessary stimulus for more symmetrical gait. Alternately, with unilateral or bilateral UE involvement, a therapist may support or mobilize the involved UE, although if the LE requires assistance, this is typically provided preferentially. Otherwise, the UE is allowed to hang freely thus not receiving any type of therapeutic intervention.

There exist bariatric treadmills (and parallel bars) which have greater load limits and which have railings on both sides. More severely-involved bariatric patients, however, are unable or unsafe to utilize these devices, due to inability to bear sufficient weight through one's arms via gripping the rail. Forearm platform supports for use in these railed environments are hence needed, as they are likewise needed and often incorporated in various walking frames and walkers.

Hence, in railed environments such as parallel bars and treadmills, a rigid framed walker, or other mechanisms/devices to accommodate an upper extremity with various types of mobile (and stationary) support surfaces do not exist, nor do devices exist to enable, facilitate, and potentiate arm movement in these environments or to achieve additional trunk rotation and movement of the upper extremities in a combination of planes of movement such as occurs during normal arm swing/gait, as a product extension proposed herein will provide.

In terms of acute medical care, a safe, efficient, readily-accessible, inexpensive low tech method of initiating functionally relevant and neurologically-stimulating movement therapy at bedside would be desirable. Nothing currently exists for this purpose. The devices proposed herein could be used for this purpose as well.

Regarding related art, there are forearm platform attachments for walkers and rollators, and at least one of these enables adjustment of the forearm support in a sagittal plane. These units cannot be used for parallel bar or treadmill application as they are designed to attach specifically to one or more varieties of walker frames. Indeed, there are also some walkers and rollators with platforms integrated into the frame. Stationary forearm support(s) are manufactured by a foreign company, specifically compatible with some of their treadmills. There are not any devices which offer mobile upper extremity support which can be variably attached to treadmill railings when platform or any other type of support is desired.

For parallel bar application, there exists the following device. A Midland Parallel Bar Glider is an expensive device comprised of two platform supports necessarily interconnected and which move as one piece in one direction along the rails. WO1996002208A2 appears related to the Midland device and discloses a one-piece frame which is placed on top of both rails, and which has bilaterally-placed forearm supports. Both devices are movably positioned on, and attached to, both rails of the parallel bar unit and support is necessarily unremovable bilateral forearm platform support. The devices cannot be used to unilaterally support an UE, alternate types of support cannot be incorporated, and independent movement of the UEs cannot occur. A strong limb cannot potentiate movement in a weaker limb. One or both of the devices specify inclusion of a braking mechanism. The primary purpose of these technologies seems to be provision of support when significant bodily support is needed to enable ambulation in parallel bars. Significant limitations of these devices exist including, both forearms must be placed on platforms and supported, this device encourages poor posture similar to the way that a platformed walker encourages poor posture, the entire upper extremity is immobilized, and the units are extremely expensive and cumbersome to attach to the parallel bars. They are not meant for use on other railed devices such as treadmills or hemiplegic bars. The upper extremities cannot move independently as is needed to achieve a reciprocating gait pattern, or to facilitate balance reactions, or to work on components of gait as related to arm swing and trunk rotation. The upper extremities are necessarily kept in a position anterior to the frontal plane of the body, i.e. with shoulders slightly flexed, which is not a neutral posturing. Neural coupling—necessary for neural recovery of LEs for ambulation—is prohibited: the upper extremities cannot move in a reciprocating manner. Product extensions and therapeutically-stimulating linkages proposed herein cannot be incorporated with these devices. Furthermore, with the Midland device, when a patient reaches one end of the parallel bars, the patient must be assisted to sit down, and wheeled backwards to the starting point in a wheelchair, hence necessitating greater personnel assist and resulting in treatment inefficiencies. Practicing turns, walking back in the opposite direction, and continuous ambulation resulting in greater distances walked is not possible with this device. Also, sidestepping cannot be accomplished with either device.

In terms of technology which enables UE movement concurrent with LE movement, ergometers exist. One model of treadmill has mobile levers which one can hang onto and which move in a back-and-forth manner, typically for purposes of adding upper body resistance exercise, yet the movement does not mimic that of arm swing and significant UE function bilaterally is needed to hang onto the levers and use a device such as this. Also, it can only be used via gripping the handles with outstretched arms. Other ergometers (exercise machines) exist which offer bilateral arm movement while in a seated (as opposed to standing) position, such as a Nu-Step. Technology is needed which can be incorporated into use with the plethora of treadmills already present in clinics, facilities, and homes, for purposes noted above.

A need exists for an improved arrangement that provides at least one or more of the following features, as well as still other features and benefits

SUMMARY OF THE DISCLOSURE

A unilateral mobile upper extremity support assembly or device is stably positioned upon, and can translate along a rail (or one support assembly for each rail) such as that which is integral to parallel bar units and treadmills for ambulation/exercise activities, or an upper frame region (which can be referred to herein as an upper rail) of a walker. It can be secured in place on the rail such that translation is completely disabled when stable immobile support surface is desired. The support assembly or device is preferably comprised of two components: one component attaches to and translates along the rail; one component is the support surface which is interchangeable and can also be omitted if not needed.

It would be desirable if any of several types of upper extremity support surfaces such as are found on various mobility aids/assistive devices could be incorporated to create the mobile support surface.

It would be desirable if the upper extremity supports could be adjusted for proper fit, function, and comfort.

It would be desirable if these surfaces could be easily interchangeable.

It would be desirable if devices, if used bilaterally, could be used with any combination of support surfaces, and with or without interconnection.

It would be desirable to have a mechanism to provide upper extremity support unilaterally in a railed environment such that the other extremity can function normally by grabbing the rail.

It would be desirable if the device could be used so as to function to provide unilateral upper extremity support.

It would be desirable if the device could be stably secured to the rail when translation is not desired.

It would be desirable to have a mechanism to vary the resistance to movement of the above device in order to make it stably positioned on a rail, as well as to vary the amount of resistance to translation along the rail.

It would be desirable to have an optional braking mechanism.

It would be desirable if the device could be used bidirectionally as well as laterally.

It would be desirable if the device could be used with or without an interconnection to the opposite rail regardless if used for unilateral or bilateral support.

It would be desirable to have a mechanism which could be incorporated into the device to which one could add incremental weight for rotational stabilization when an interconnection is not incorporated.

It would be desirable if the device could be used on round rails of various diameters as well as rails of variable cross-sectional shape.

It would be desirable if the device had a mechanism by which a mechanical linkage(s) could be attached for use as desired/indicated.

A device which when used bilaterally, and with or without an interconnection, independent movement of the upper extremities is possible/allowed. Variably, when used bilaterally, the support surfaces can be kept in the same position relative to each other, in a symmetrical or asymmetrical manner.

A device which can be mechanized such that an alternate source of energy drives the movement of one or both upper extremities in cases when this is desirable.

A device which enables mobilization of a weak(er) upper extremity by a stronger upper extremity would be helpful.

It would be desirable to have multiple linkage designs from which to choose.

It would be desirable to be able to use the device(s) without a mechanical linkage between devices in those cases in which rotational stabilization is not needed for safety purposes.

It would be desirable if the depth of the cross bar and reciprocating linkages could be adjusted for fit and function, and can be easily attached, and could also remain functionally in place when an individual turns to walk in the opposite direction or could be reattached so as to remain in front of the individual.

It would be desirable to have a mechanism to enable independent movement of one upper extremity relative to the other, and which hence enable (in part) work on reciprocating arm movement.

It would be desirable if the device with upper extremity support surface, when repositioned relative to the body (moved forward or backward on the rail) would create the same amount of motion in the opposite direction of the opposite upper extremity resting on a support surface, i.e. reverse motion.

It would be desirable if the back and forth movement of the assemblies would be independent of translation of the devices along the rail.

It would be desirable if this linkage could be used bidirectionally.

It would be desirable if this movement could be mechanized.

It would be desirable if the mechanical linkages could be adjusted for variable width between parallel rails.

It would be desirable if additional features could be added to the linkage(s) to add therapeutic benefit, such as audible and/or additional visual cuing (e.g., an audible cue at an end range of movement).

It would be desirable to have a mechanical linkage which would create in phase movement of the devices (simultaneous and equal amount of movement).

A device which is stably supported on the rails and which can be used in conjunction with mobile units in order to further stabilize the device, when stationary support is desired, and to delineate a prescribed range of movement of mobile units for functional and safety purposes (Motion Stoppage Blocks).

An alternate method of achieving upper extremity support and/or movement in a railed environment which involves movement of the upper extremity support surface along a track which is stably positioned upon a rail such as is part of treadmills or parallel bar environment.

It would be desirable to have tracks of variable length and shapes to enable various types of training.

It would be desirable if different types of support surfaces (forearm trough and cane grip, for example) could be incorporated for use using this method.

It would be desirable if mechanical linkage such as reverse motion linkage could be used with this arrangement.

It would be desirable if mobile support which glides along a track securely positioned to a rail could be used unilaterally or bilaterally.

It would be desirable if additional movement of the shoulder could be allowed/enhanced, such as more rotation which results in movement in the transverse plane and which is represented by a more curved path of movement.

A method of creation of amputee orthoses for use with the above devices is provided such that upper extremity support can be achieved regardless of the level of amputation, in order to be able to perform gait training and ambulation activities in railed environments.

It would be desirable if the support surfaces can be kept in the same position relative to each other when used bilaterally such that they move in parallel and in synch.

It would be desirable to have an interconnection enabling independent movement of the upper extremities, with translation range limitations.

Still other benefits and advantages of the present disclosure will become more apparent from reading and understanding the following detailed description.

DETAILED DESCRIPTION

Figure 1A:
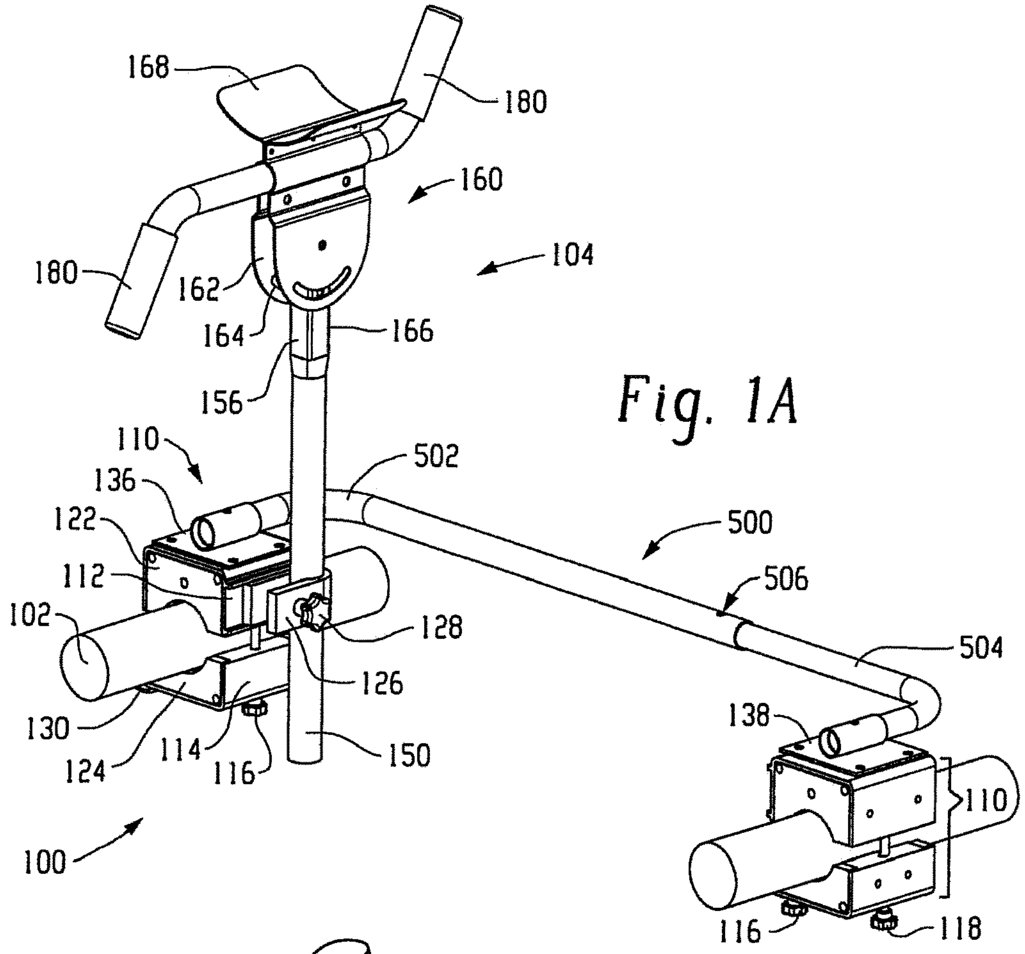
FIG. 1A is a perspective view of a mobile platform support assembly, device, or unit for use with a parallel bar or support rail

With reference to the accompanying Figures, there is shown a mobile patient aid assembly 100 with at least one support assembly, device, or platform 110, and that may include a patient grip such as cane grip 400 and may or may not include a stabilizing cross bar linkage 500 that is particularly useful for a patient who exhibits upper extremity (UE) dysfunction preventing the patient from gripping and utilizing a rail 102 for support in this manner as well as for cases in which postural support is desired and/or needed. More particularly, the patient aid assembly 100 is adapted for use in connection with training and exercise such as for rehabilitation and also in connection with other medical, sports, or fitness settings. When two mobile support assemblies 110 are used, they can be linked with the cross bar linkage 500, or the reverse motion linkage 200, or unlinked with or without counterweights added to stabilize the assemblies.

Shown in FIG. 1A are components of the mobile support assembly 110 that has a forearm support (to be described further below) secured to at least one rail 102 and in this instance, the rail linkage assembly 110 on the opposite rail is without any upper extremity support assembly attached. In addition, the patient aid assembly 100, and particularly the support assembly 110 includes a cross bar linkage 500 extending substantially perpendicular to the rails 102 and interconnecting the assemblies together. The assemblies 110 are connected to a bar, rail, etc., 102. The bar 102, for example, may be a single bar of a parallel bar rehabilitation device, or a support rail of a treadmill, or an upper frame region (which can be referred to herein as an upper rail) of a walker. Thus, although the bar 102 is shown as having a circular cross-section, it is also recognized that other cross-sectional conformations of the rail or bar may be encountered and the mobile assembly 110 is adaptable thereto. A platform assembly is the type of upper extremity support assembly incorporated in this example and as shown in the left-hand portion of FIG. 1A. The platform assembly (on the left-hand rail in FIG. 1A) or grip assembly (shown on the right-hand rail in FIG. 1A) can be attached for use by the opposite upper extremity, hence creating a mobile platform unit 110 or a mobile grip unit 400, or variably the patient can grip the rail on that side instead of being supported, which enables free independent movement of the arms.

Figure 1B:
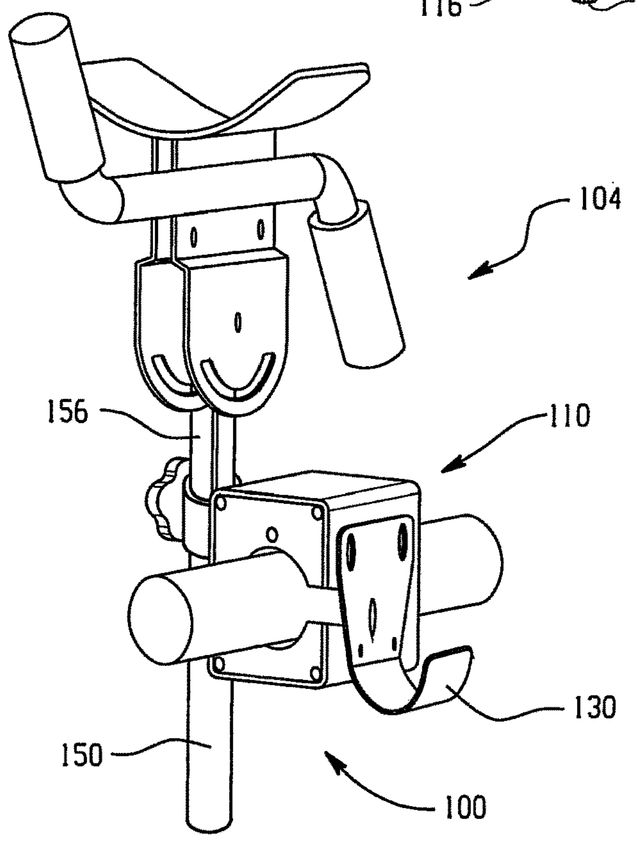
FIG. 1B is a perspective view of the same mobile platform unit without a cross bar stabilizing linkage.
Figure 1C:
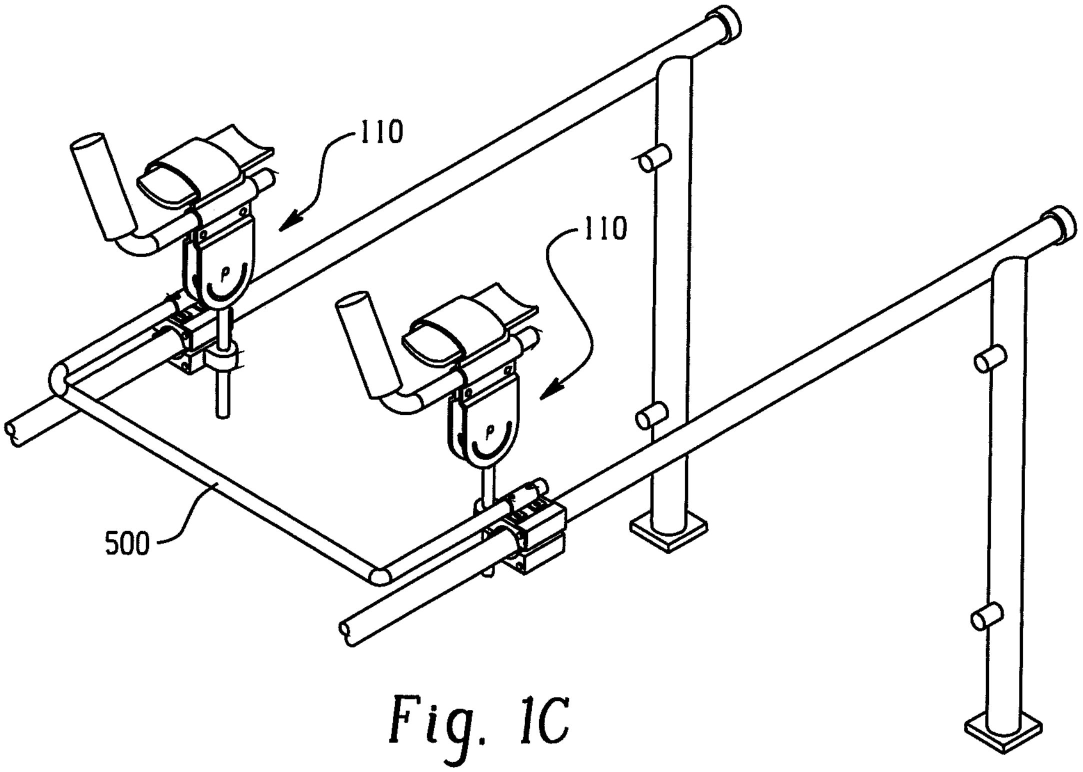
FIG. 1C shows two mobile platform units (one on each rail/bar) with an interconnecting cross bar linkage.
Figure 1D:
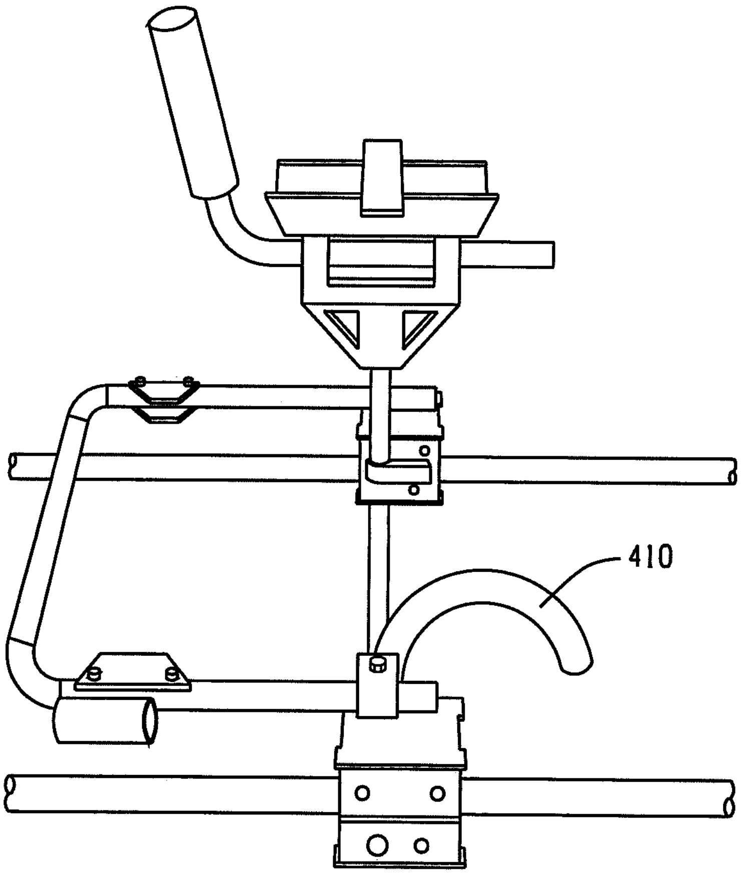
FIG. 1D illustrates of one mobile platform unit and one mobile grip unit 400 attached to rails and linked with linkage 500.
Figure 2A:
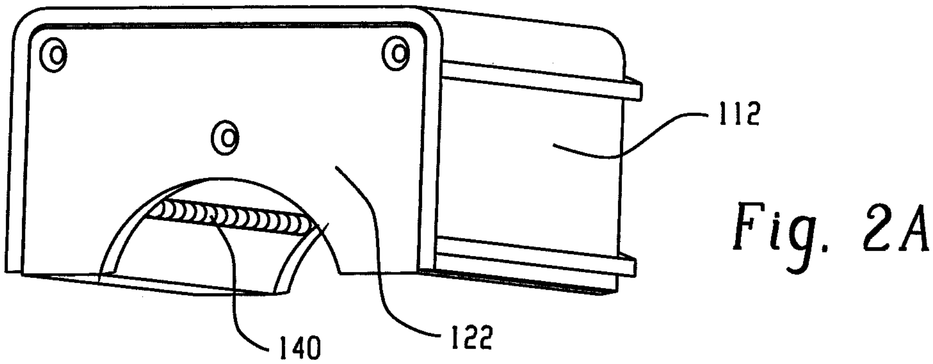
FIGS. 2A-C are additional enlarged perspective views of a portion of the unit of FIG. 1A.
Figure 2B:
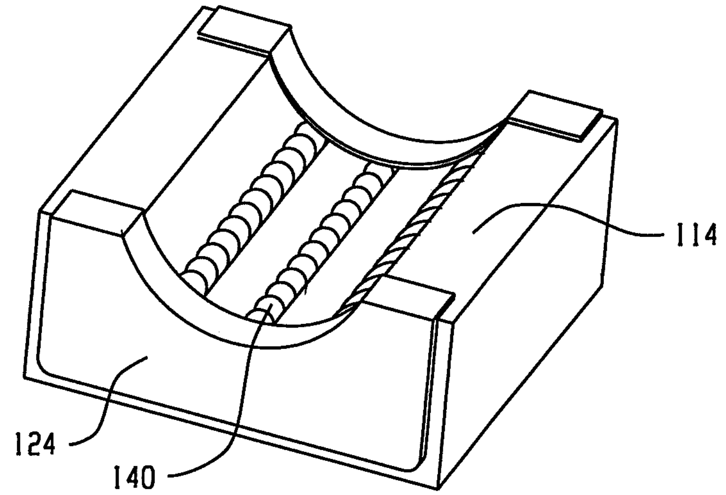
Figure 2C:
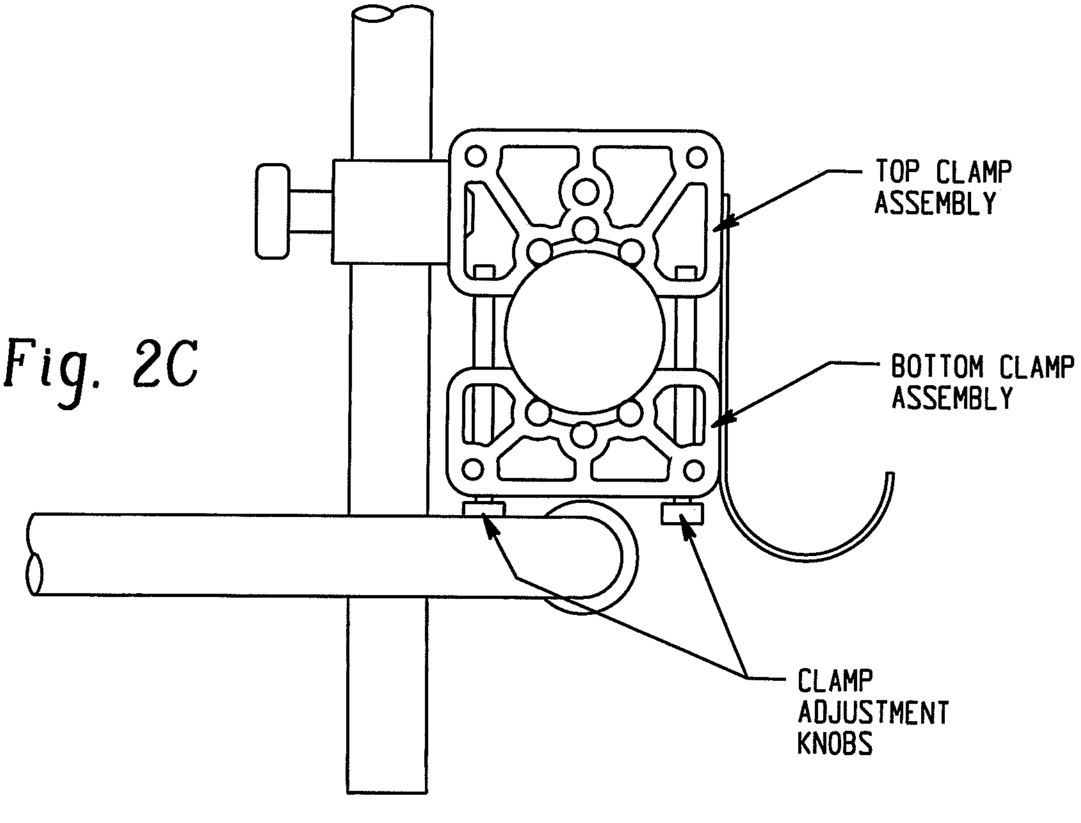

Shown in FIG. 1B are the components of the mobile assembly 100 shown without a cross bar linkage but with a counter weight hanger 130. Of course other configurations may be used such as of two mobile units, one with a platform assembly and one with a grip assembly and with bar linkage in place. FIG. 1C shows two mobile platform units 110 (one on each rail/bar) with an interconnecting cross bar linkage 500. FIG. 1D illustrates one mobile platform unit 110 and one mobile grip unit 400 attached to rails and linked with linkage 500. As is further evident in FIGS. 1C and 1D, the linkage 500 is generally C-shaped with first and second portions extending substantially parallel and forwardly of the units 110, 400 attached to respective rails, and an interconnecting portion spanning therebetween. FIG. 10E illustrates two mobile platform units 110 stably positioned on respective parallel bar railings 102 with a cross bar linkage 500 in place. FIG. 1D shows a mobile platform unit 110 linked with linkage 500 to a mobile grip unit 400. The assemblies 104, 110 are received around the respective rails for sliding movement relative thereto, and in this embodiment, the cross bar linkage 500 assures that the assemblies move in unison along their respective rails. FIGS. 2A-2C show close up views of the rail linkage assembly component shown in FIG. 1A.

The patient aid assembly 100 includes a platform assembly 104 and a rail linkage assembly 110 shown here as a mount having a top clamp assembly and a bottom clamp assembly which together encapsulate the rail and in which first and second mounting members 112, 114 (FIG. 1A) are held together by two adjustment knobs 116 and 118. The top clamp assembly includes the top clamp 112, ball bearings 140, and bearing retainer plates 122 at the front and the back (FIG. 1A). The bearing plates are secured to the top clamp assembly using fasteners such as screws, for example, and prevent the ball bearings from falling out. The bottom clamp assembly includes the bottom clamp 114, ball bearings 140, and bearing retainer plates 124 at the front and the back. The bearing retainer plates are secured to the bottom clamp using fasteners such as screws, for example, and prevent the ball bearings from falling out. Each mounting member 112, 114 is configured to form a portion of a cavity 120 that encloses the bar 102 when the mounting members are secured together by tightening the adjustment knobs 116, 118. Loosening or tightening the knobs allows the rail linkage assembly 110 to fit different shapes and sizes of rails. Of course other structural arrangements may be provided for securing or latching the first and second mounting members 112, 114 together.

Extending inwardly into cavity 120 from the mounting members 112, 114 are ball bearings 140 FIG. 2A which are arranged longitudinally, preferably three rows in each of the two clamp assemblies. The ball bearings contact the rail and allow the assembly to travel freely along the rail. The bearings 140 are used to provide a minimal resistance to movement of the mount 110 (and likewise the remainder of the assembly 100) along the longitudinal extent of the bar 102. As perhaps best illustrated in FIGS. 2A-C, the bearings 140 are disposed in spaced relation about the bar, i.e. in circumferentially spaced relation, and extend radially inward from the remainder of the mounting members 112, 114. In this manner, contact between the mount 110 and the bar 102 is preferably limited to contact between the rollers and the outer perimeter surface of the bar. Since the bearings 140 can rotate/roll, the mount 110 travels along the longitudinal extent of the bar 102 in response to force applied thereto. The particular size, number, mounting, configuration, etc. of the bearings 140 may be varied without departing from the scope and intent of the present disclosure, and of course the present disclosure also contemplates other mechanisms that allow relative sliding movement between the mounting members and the bar. Moreover, it is contemplated that the amount of force required to move the mount 110 along the bar 102 may be varied, for example by varying the clamping pressure associated with the securing mechanism 116 and 118. This would alter the frictional forces imposed by the bearings 140 on the external surface of the bar 102 and thereby require a greater or lesser amount of force to advance the mount 110 along the bar. Indeed, the clamping pressure can be made sufficient as to render the mount immobile.

Figure 4:
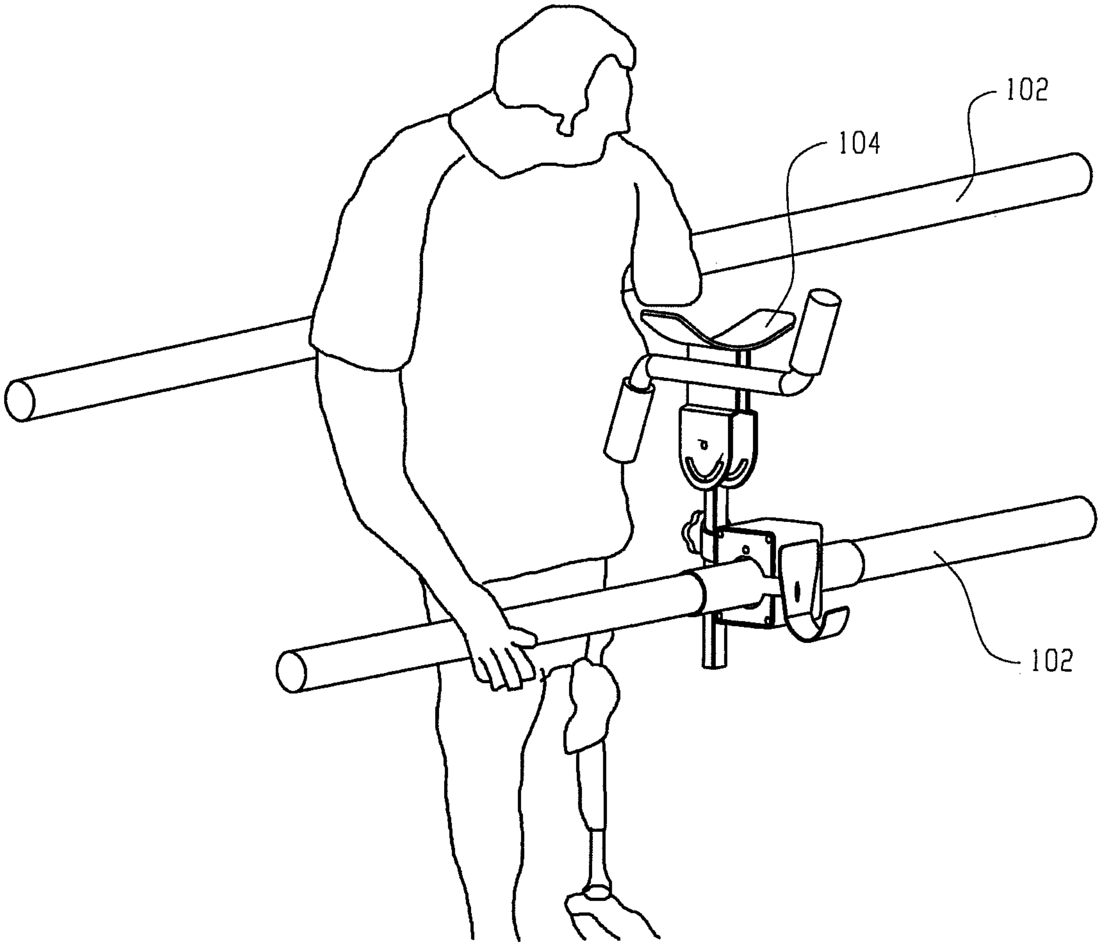
FIG. 4 shows a patient with unilateral upper extremity dysfunction rehabilitating in parallel bars where the support platform is rotated approximately 90° relative to the longitudinal axis of the parallel bar with cross bar stabilization.

An elongated support member, hollow tube, or pole 150 (FIGS. 1A, 1B) is mounted to and extends upwardly from the mobile mount/rail linkage assembly 110. For example, the support member 150 may be a tubular structure that is mounted to the inside of the top clamp assembly 112 using a tube clevis 126. Alternately, the tube clevis 126 could be attached to other locations on the assembly without changing the scope of the disclosure, as would be necessitated in order to create a medial attachment location for the reverse motion (or other) linkage. The support member can be of variable length, such that one can incorporate a platform assembly which is variably used in conjunction with a walker, which would necessitate a longer length tubing for connection purposes to the walker, or a shorter more manageable length support member can be used. One can loosen or tighten the clevis adjustment knob 128 in order to reposition the upright tube relative to the mount 110. Likewise, the support member 150 has a sufficient length that allows height adjustment of the support member 168 relative to the mount 110. Once the height is selected for the patient, the knob 128 is tightened to hold the desired height. Of course, other securing or mounting arrangements that allow for ease of rotational and height adjustment of the support member 160 relative to the mount 110, and subsequent locking or tightening of the securing arrangement to maintain the desired orientation and height, can be used without departing from the scope and intent of the present disclosure. This allows for varying forearm positions relative to the body while walking parallel to and within the bars, as well as allowing the platform assembly (to be described below) to rotate ninety degrees, hence enabling sideways stepping within the parallel bars (FIG. 4). The counter weight hanger 130 (FIG. 1B) is affixed to the outside of the rail linkage assembly by fasteners such as screws. Screw holes 132 are ready to accept screws such that one can attach the hanger 130 to the bottom clamp assembly 114, and elongated screw holes 134 in the hanger allow for adjustment of the variable distance between clamp assemblies (FIG. 1B).

In cases in which rigid vertical stability of the mobile platform or grip unit is not needed, varying amounts of counterweight can be added, such as by hanging ankle weights on the hanger 130, although it is understood that other mechanisms of adding counterweight to the side opposite the platform assembly attachment can be used. In cases in which rigid vertical stability of the device is desired, an interconnecting member such as a tubular structure or a cross bar linkage 500 can be added, serving as connection between two rail linkage assemblies. Indeed, any of the mechanical linkages described herein can be used for this purpose. A mounting plate 136 (FIG. 1A) is mounted to the top surface of the top clamp assembly on one side, and receives a first portion of the interconnecting member, e,g, a large tube 502 (FIG. 1A). Longer sections of tubing can variably be attached to the mounting plates on either side, in order to increase the distance between the cross bar and the rail linkage units, such that an individual can turn around and walk in the reverse direction without repositioning the bar to the other end of the rail linkage assembly. As such, after turning, the cross bar 500 will be positioned at the necessary distance to allow sufficient room for the person's body behind the assemblies. Variably, the cross-bar linkage can be disconnected and reconnected to face the opposite direction, such that upon turning, the linkage once again is anterior to the person using the device. A quick release/connect device such as a spring button is retained inside the large tube and engages the hole in the tube mounting plate and locks the the tube and mounting plate together. By depressing the spring button, the large tube can be removed. The large tube extends away in a perpendicular direction from the parallel bar railing or other railing 102 and receives a second or small tube 504 (FIG. 1A). A spring button 506 cooperates with the tubes to enable variable width adjustment of the cross bar 500 (FIG. 1A) to accommodate variable widths between rails 102. The small tube 504 continues and the spring button 506 in the small tube engages the hole in the small tube mounting plate 138 (FIG. 1A) which is mounted to the top surface of the top clamp assembly 112 on the opposite rail. One could also secure the large and small tube mounting plates 136, 138 to other locations on the device or use alternative, equivalent securing mechanisms that achieve the same function, without departing from the scope and intent of the present disclosure.

At an upper end 156 of the support member 150 is provided a platform 160 (FIGS. 1A, 1B). Further, the platform 160 may be angularly adjusted relative to the axial orientation of the support member 150. For example, an angular adjustment member 162 includes an arcuate groove or opening 164 that receives a fastener 166. Once the desired angular orientation in the sagittal plane of the adjustment member 162 is determined, the fastener(s) 166 is tightened to maintain the desired orientation (FIG. 1A). It must be understood that several varieties of forearm platforms exist, such as those without a feature for sagittal plane adjustment of the forearm trough as is accomplished with this angular adjustment member. Accordingly, the subject disclosure should not be limited to the specific embodiment shown and described herein.

The platform 160 further includes platform support surface 168 which is shown as a smoothly curved surface forming a recess to receive, for example, a forearm of the patient. This platform 160 may be desirable when the patient cannot grab the rail 102 or provide adequate bodily support for one of several physical reasons via gripping with the hand. In addition, handle grips 180 are provided at opposite ends of the forearm platform support surface 168 (FIG. 1A). The handle grips 180 are positioned 180° relative to each other such that when one or more rail linkage assemblies 110 is attached to the rail 102, the unit can be used for ambulation in either direction within the parallel bars or when on a treadmill. This is accomplished by rotating the grip handle 180 degrees which is perhaps performed more easily than rotating the entire device by means of rotating the tubular support member 150 within the tube clevis.

The mobile upper extremity patient aid assembly shown herein provides a much-needed device for rehabilitation and other medical and exercise concerns. The unilateral mobile patient upper body support is advantageously movably positioned on a railing 102, or one on each of the two railings such as those which are components of parallel bars, hemiplegic bars, treadmills, or rails which are components of still other devices utilized for exercise/walking. It can also be stably secured to the rail for stationary activities in railed environments. It can be positioned with or without a cross bar linked to a unit on the opposite rail, and the unit on the opposite rail can be equipped with a grip or platform assembly, or neither, such that the patient grabs the rail on that side. In the case of the reverse motion linkage described below, it can be designed with the same attachment location and mechanism as the interconnecting member or cross bar linkage 500, and one would use any combination of grip and platform assemblies for upper extremity support on each of the two rails 102, as this linkage facilitates movement of one limb with respect to the other. When the interconnecting member or cross bar linkage is not in place, one can variably use the unilateral mobile support platform with or without incorporation of counterweights which add rotational stability about the railing. Linked or unlinked, a patient can walk along the perimeter of standard parallel bars, using a platform support unilaterally, as is also accomplished when incorporating the device on hemiplegic bars. The handle portion 180 of the platform assembly provides grips at each end, positioned at 180 degrees relative to one another, such that a patient can place the forearm on the assembly in either direction, i.e., the patient can face either direction when walking on devices such as a treadmill or within the confines of parallel bars. The support member can also be rotated within the tube clevis in order to reposition (e.g., turn 180 degrees) any alternate forearm platform assembly with a handle with a grip on only one end in order to enable ambulation in the reverse direction. The positioning of the support 168 can be readily adapted for patient comfort and other needs.

The rail linkage assembly 110 is preferably a two part assembly and thereby can accommodate a range of diameters of the bar/rail and cross-sectional configurations of the bar 102 in order to be compatible with a variety of makes and models of parallel bars and treadmills. Further, the rail linkage assembly 110 will glide along rails 102 with low friction, and the frictional resistance may be adjusted if desired.

The assembly 100 can be used unilaterally or bilaterally, and can be used to provide upper extremity/upper body support as well as enablement and facilitation of upper extremity movement during walking with these devices. The assembly 100 also enables continuous upper body support for parallel bar use, which is desirable in some cases, and which otherwise enables continuous rhythmic movement of the arms, whether linked or unlinked mechanically to an assembly on the opposite rail. The rail linkage assembly 110 can variably accommodate attachment of the different types of platform and grip assemblies (as further described below) instead of the standard platform assembly with two-ended tubular handle which comprises the above-described platform assembly illustrated in FIG. 1.

Figure 11:
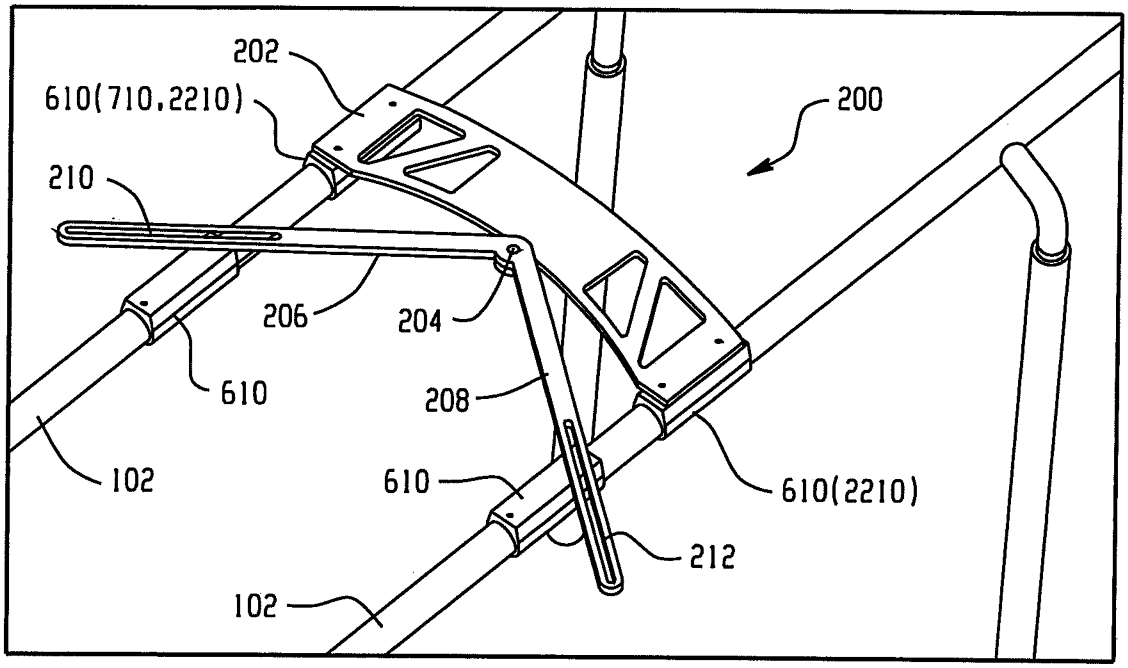
FIG. 11 illustrates a reverse motion linkage in combination with rail linkage assembly in a parallel bar environment.

FIG. 11 shows a linkage assembly 200 that provides for reverse motion of first and second rail linkage assemblies 110 when secured to parallel bars 102. More particularly, the linkage assembly 200 includes a spanning member 202 that extends between the first and second bars/rails 102. A generally centrally disposed pivot 204 is provided on the spanning member 202. The pivot 204 mounts first and second links 206, 208 to the spanning member 202. In this embodiment, the first and second links 206, 208 are disposed in fixed relation to one another, shown here at an included angle of approximately 90° relative to one another. In addition, the links 206, 208 each include a respective elongated slot or opening 210, 212, respectively, adjacent the outer ends of the link that receives a pin 214. The length of the links 206, 208, the included angle, and the length of the respective openings 210, 212 are designed so that the out of phase movement that is associated with arm movement during a normal gait can be achieved. The linkage assembly 206, 208 rotates about pivot 204 and facilitates the out of phase movement of the upper extremities. A pin 214 extends from each mobile upper extremity assembly 610 for receipt through a respective opening 210, 212. As is evident in FIG. 11, the pin 214 is located adjacent to one end of the opening 210 in the first link 206 associated with one of the mobile upper extremity assemblies and the pin 214 is located adjacent the other end of the opening 212 in the second link 208 associated with the other of the mobile upper extremity assemblies.

The reverse motion linkage 200 of FIG. 11 is advantageously used between rail linkage assemblies 110 when these are positioned bilaterally on bars or railings 102 such as those listed above. The reverse motion linkage 200 can be readily attached to each of the two rail linkage assemblies and then a platform assembly 104 or grip assembly 410 attached to create a mobile platform unit 100 or mobile grip unit 400 (FIG. 1D). Reverse motion of the rail linkage assemblies (and therefore any support surface attached thereto) is achieved. This movement is translation of the two mobile upper extremity assemblies along the parallel rails. Alternately, of course, the perpendicular member on which is located the pivoting mechanism of the reverse motion linkage can be caused to be stably positioned on the rails of the parallel bars by securing the rail linkage assemblies to the rail. Thence, one can move the upper extremities while standing or marching in place, as would also be done when using the linkage on a treadmill. When the pivot point is stationary, all of the energy transferred to one of the devices (as opposed to potentially just a portion when walking forward between parallel bars) would potentiate movement in the opposite device. The relative positioning of mobile upper extremity assemblies 110 can be locked in place if desired. The reverse motion linkage 200 will serve to potentiate out of phase movement of the upper extremity assemblies. In the presence of asymmetrical upper body function, such as occurs in various neurologic disorders such as Parkinsons Disease, stroke, and spinal cord injury, the linkage 200 will serve to transfer the energy from movement of one platform unit to the other, thereby therapeutically stimulating the involved UE and creating a mechanism to achieve symmetrical, rhythmical upper body motion. Bidirectional active use of both UE will be enabled. Enhancing out of phase upper extremity movement during gait training activities is thought to facilitate recovery of lower body function. Hence, this apparatus will serve a very important role in neurologic gait rehabilitation. The apparatus of the present disclosure could variably be used to enable introduction of an external power source for movement of the devices, with variable speed adjustment. Mechanical control would supply the stimulus which is not infrequently needed, to create unilateral or bilateral UE movement during walking activities, and it would also create symmetrical excursion distances of both upper extremities, which is desirable. Resistance component can be incorporated when manually-powered to enable greater upper body strengthening when using this linkage. An additional sensory feedback device such as an audible signal (switch) can be turned on/off, for noise when one mobile upper extremity assembly or platform reaches a position at either end of maximum excursion distance relative to the other unit. This is an optional feature which could be readily incorporated and will benefit patients such as those with Parkinson's Disease. It is also intended that the linkage assembly 200 can accommodate different types of supports or grips being mounted on the mobile mount or rail linkage assemblies 110.

Figure 3:
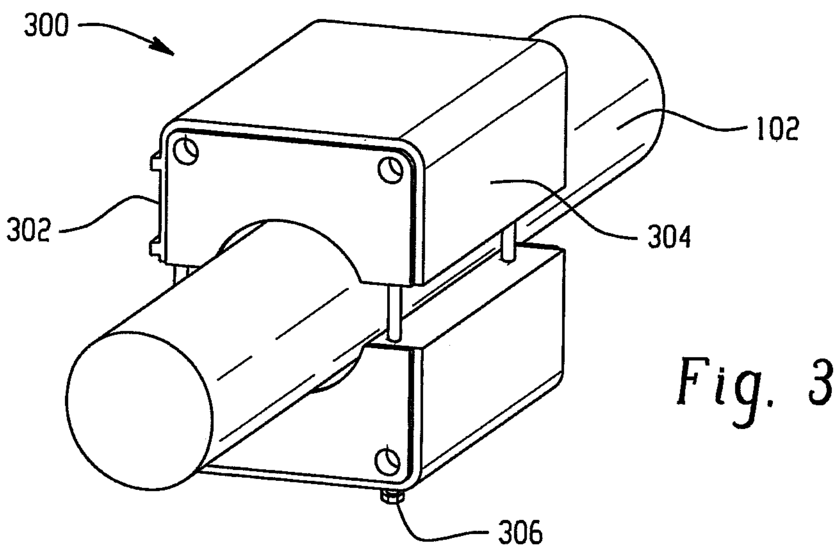
FIG. 3 is a perspective view of a stop used on a parallel bar or support rail.

FIG. 3 illustrates an embodiment of a stop or motion stoppage unit 300. The stop 300 bears some similarities in construction to the mount 110 of the mobile upper extremity assembly described in connection with FIGS. 1 and 2. More specifically, the unit 300 may be a clamshell design or other two part assembly in which downwardly extending flanges 302, 304 are selectively tightened or clamped relative to one another via the securing mechanism 306. The stop is not intended to glide along the bar/rail 102 but rather is clamped in place to serve as a stop that precludes further advancement of a mobile upper extremity assembly 110 along a bar/rail 102. The stops 300 can be positioned at each end of the bar/rail 102 and a maximum excursion distance may be modified by moving one stop relative to another.

The motion stoppage units 300 are preferably comprised of two clamp assemblies in design and preferably attached and secured to the rail 102 just as the rail linkage units are. Once clamped on to a rail 102 at a certain location, the stop unit 300 remains stationary, i.e., it does not translate along the bar/rail. When two stop units 300 are placed in spaced position along the bar/rail 102, e.g., one on either end, and adjacent to, a rail linkage assembly 110, motion of the rail linkage assembly is blocked hence achieving stationary fixation of the mobile aid with platform 100 or mobile aid with grip 400 the rail when this is desired. When two stops 300 are placed at two locations along a rail 102, other than adjacent to the rail linkage assembly 110, the stops define the distance allowed for translation of the rail linkage assembly when arm movement is occurring during walking on the treadmill or when marching in place in parallel bars.

FIG. 1D shows a grip assembly 410 that can be adapted for connection to a rail linkage assembly 110. For example, the grip 410 may be configured like that of a cane handle (or any one of the wide variety of grips that are also shown in FIGS. 9A-9L) and mounted on or received over the rail linkage assembly 110. A mobile grip unit 400 is desirable for use in situations or cases in which a forearm platform (such as platform assembly 104 in FIG. 1A) is not needed for supported walking with parallel bars, hemiplegic bars, a treadmill, or still other patient aid device, yet continuous upper extremity support via gripping and/or a mechanism to enable work on reciprocating arm movement in parallel/hemiplegic bars or treadmill is desired. It is understood that the grip could be also oriented in other positions relative to the top surface of the top clamp assembly, to accommodate a more natural and neutral posturing of the wrist when gripped.

In FIG. 4, varying forearm positions are represented in this embodiment. More particularly, the platform assembly 104 is rotated ninety degrees, hence enabling sideways stepping within the parallel bars 102 while walking parallel to and within the bars. The device is shown being used with (9B) the interconnecting member or cross bar linkage, but may also be used without the interconnecting member.

Figure 5:
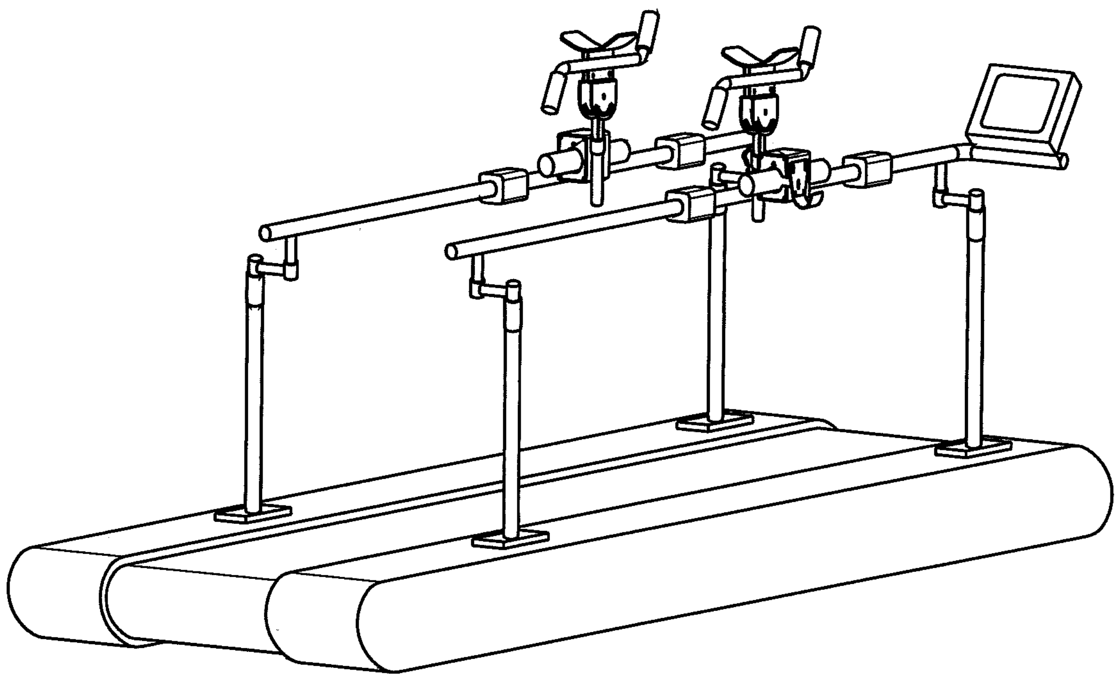
FIG. 5 illustrates application of the mobile platform units on support rails of a powered treadmill, unlinked, with counterweight hanger with weights in place in order to remain vertical when resting unloaded.

FIG. 5 shows a powered treadmill with longitudinally spaced stops that limit the movement of the bilateral forearm supports which are being used without a mechanical linkage.

Figure 6:
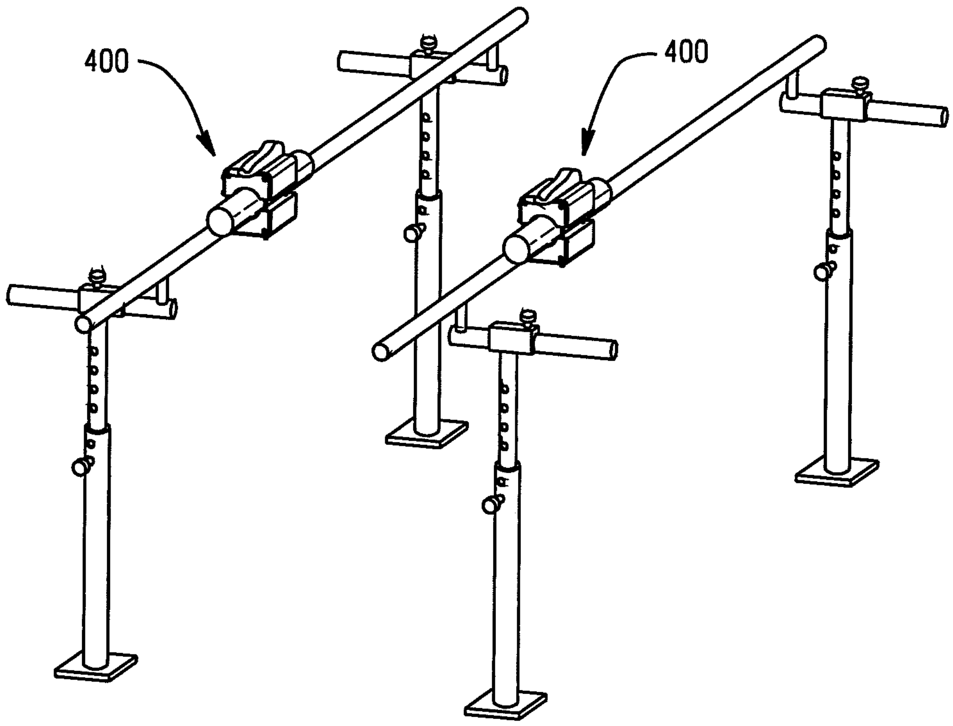
FIG. 6 shows two mobile grip units, one on each bar of a parallel bar device and a counterweight could be added for upright unloaded positioning, yet would unlikely be needed when in use as a mobile grip unit.

FIG. 6 illustrates two mobile grip units 400 received on each of the two bars in a parallel bar environment. Of course it will be understood that the units can be used unilaterally as well, as well as linked with the reverse motion linkage or the cross bar linkage.

Figure 7:
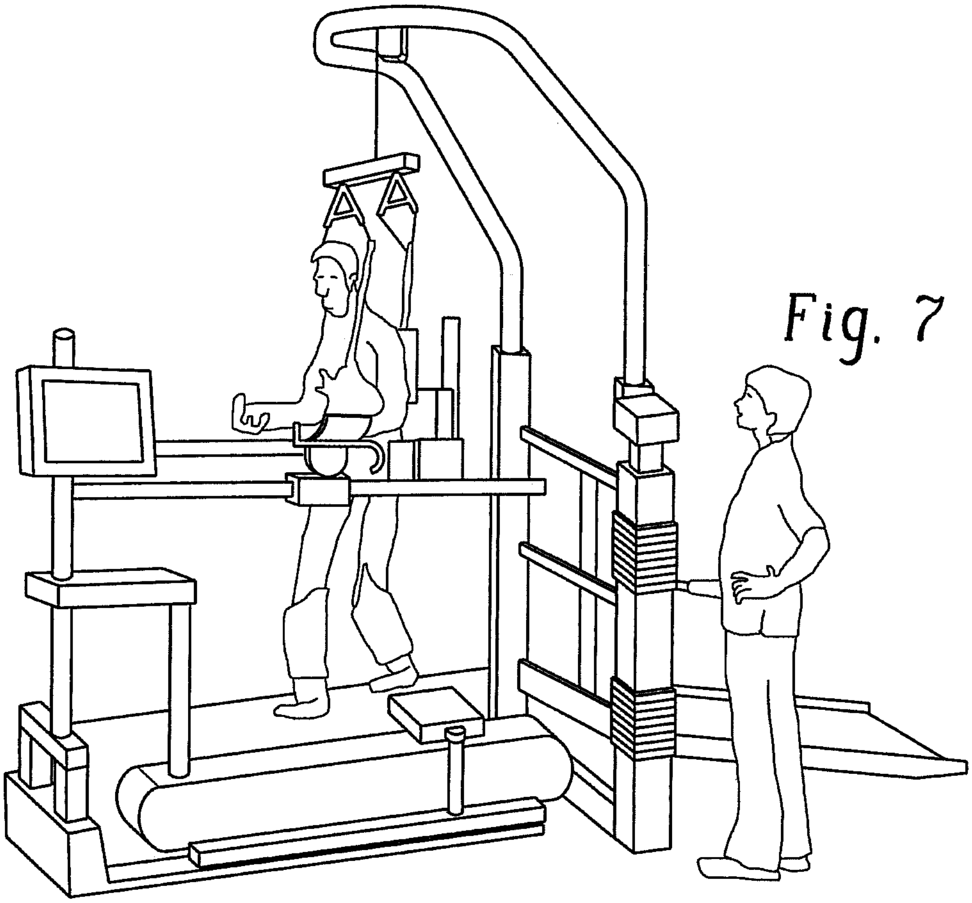
FIG. 7 illustrates a patient rehabilitating on a powered treadmill with two mobile platform units in use, which could either be unlinked, linked with reverse motion linkage, or cross bar linkage.

FIG. 7 shows bilateral platform units used in the power treadmill environment with body weight support and lower body robotic exoskeletal systems. The units could be linked with a cross bar for stable support, linked with reverse motion linkage, or unlinked.

Figure 8:
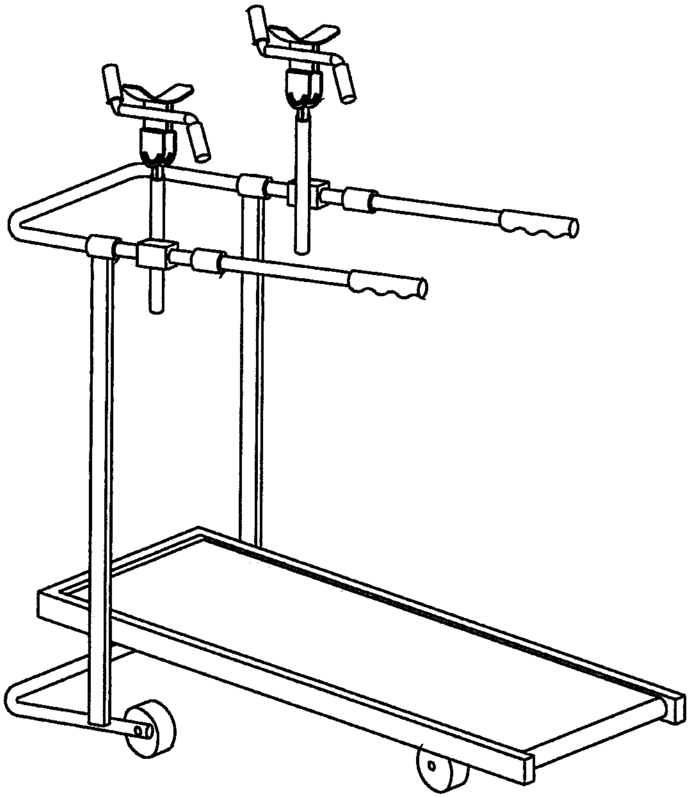
FIG. 8 shows use of platform units on support rails of a nonelectric treadmill for home use. Cross bar linkage to stabilize, and motion stop units are in place to prevent slippage.
Figure 9A:
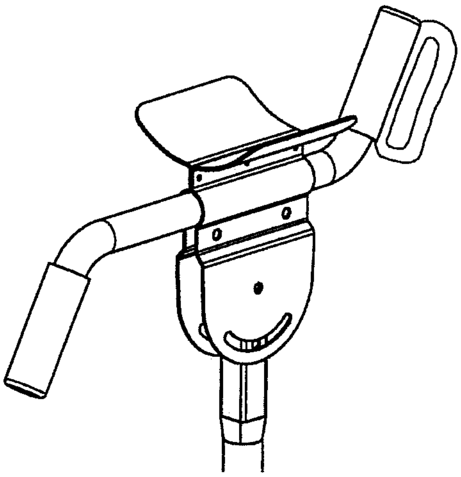
FIGS. 9A-9L show different handles, grips, orthoses to secure the wrist and hand to the device, and forearm supports.
Figure 9B:
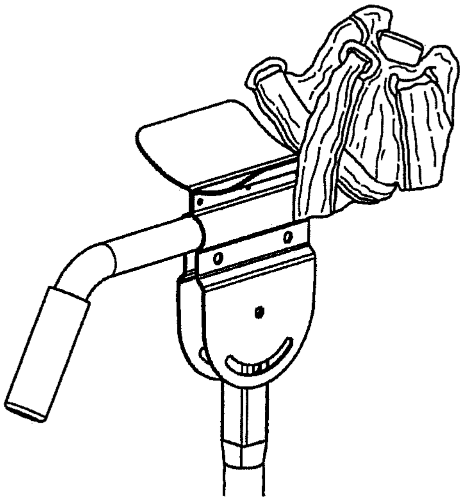
Figure 9C:
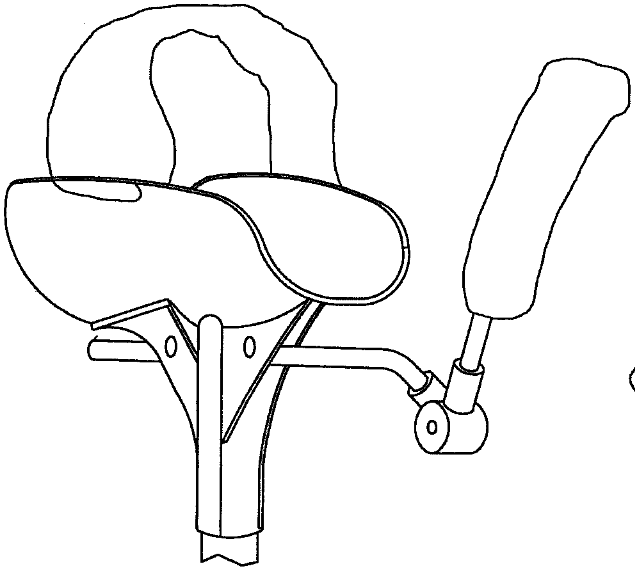
Figure 9D:
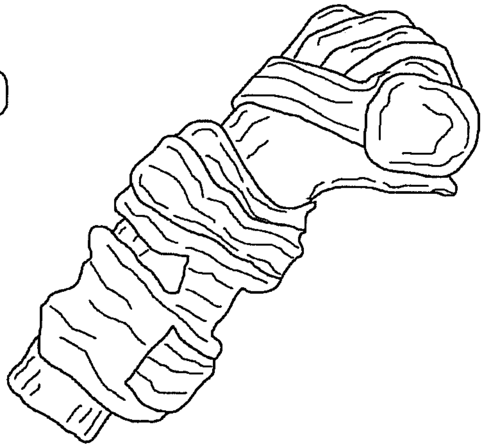
Figure 9E:
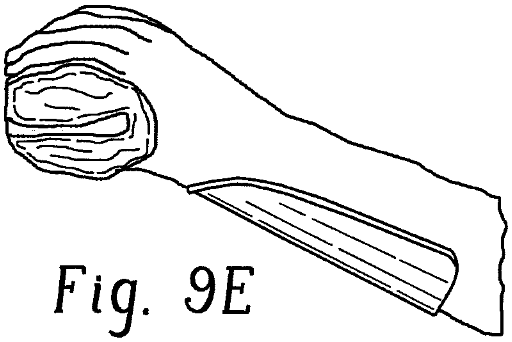
Figure 9F:
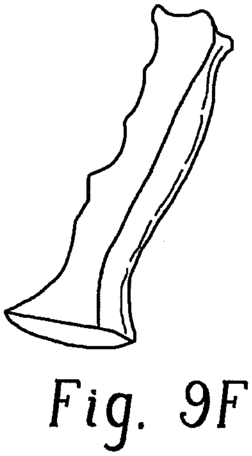
Figure 9G:
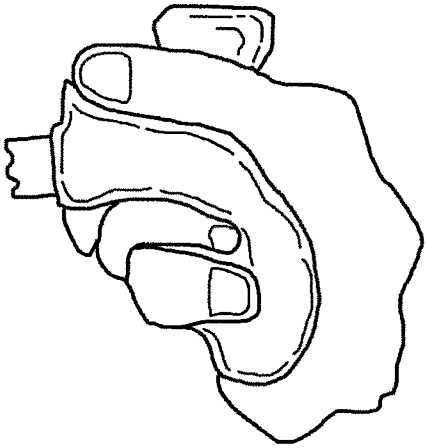
Figure 9H:
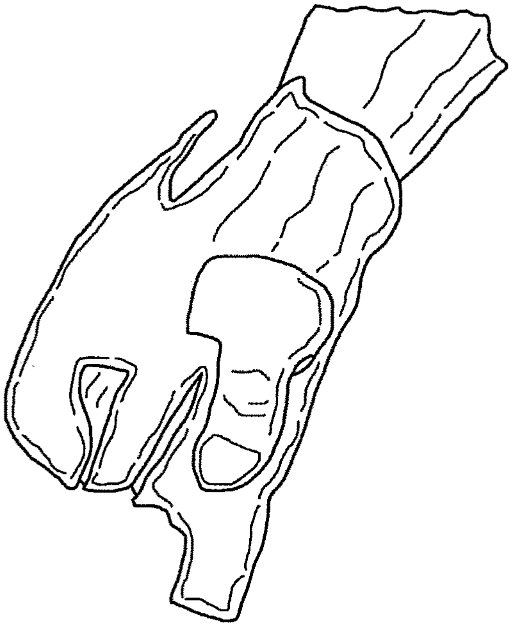
Figure 9I:
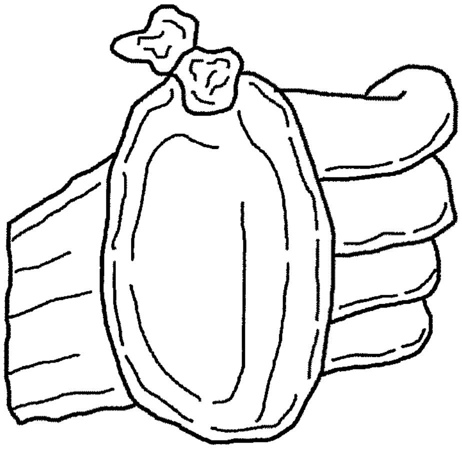
Figure 9J:
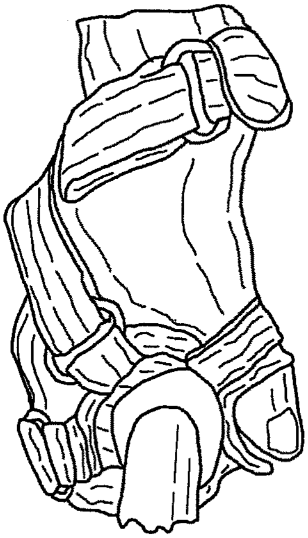
Figure 9K:
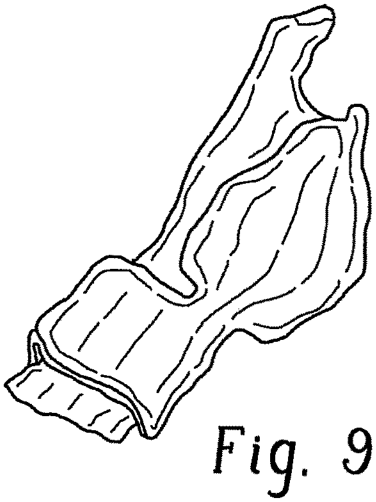
Figure 9L:
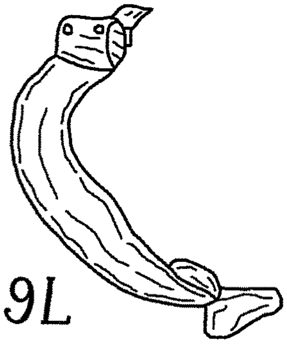

FIG. 8 shows an unpowered or manually operated treadmill that includes bilateral platform supports mounted on the support bars of the treadmill. In this example, motion stops abut both ends of both rail linkage assemblies, to prevent translation, and a cross bar linkage is also in place to stabilize the units.

It is understood that still other combinations of these features may be used such as two linked platform units in a hemiplegic bar environment. The handles are facing opposite directions, such that a patient can walk along one length, and replace the involved upper extremity onto the platform on the opposite rail for walking in the reverse direction on the opposite side or one could walk in the reverse direction by utilizing the hemiplegic bars in the normal fashion—i.e. grabbing the rail for the "return trip" with the sound/uninvolved hand. Alternately, the cross bar linkage can be incorporated simply to provide stability for use of the device on one side of the bars. A mobile platform unit or mobile grip unit could also be used without the cross bar linkage, with or without a counterweight, for ambulating solely on one side of the railed device. One can see that the functionality of hemiplegic bars is enhanced with this technology, by enabling functional rehabilitation of an involved upper extremity, as well as enabling therapist intervention to more easily access the patient during gait training.

In yet another arrangement, first and second platform units received on respective rails in a standard parallel bar environment may be provided. The handles are rotated, for use as one walks along the perimeter of the parallel bars or variably such that if a forearm platform support is used unilaterally, one can replace the affected limb on the device on the opposite rail upon turning and walking in the reverse direction.

FIGS. 9A-9L show different handles, grips, platform supports, and orthoses which can be used for example in conjunction with or instead of the platform support assembly 160. These are merely representative of a wide array of handle/grip/platform designs and securing mechanisms for the hand that can be used and should not be deemed to limit the present disclosure to a specific design. These exemplify improvements which can be made to a forearm platform assembly in terms of improving upper extremity functionality with this device.

Figure 12A:
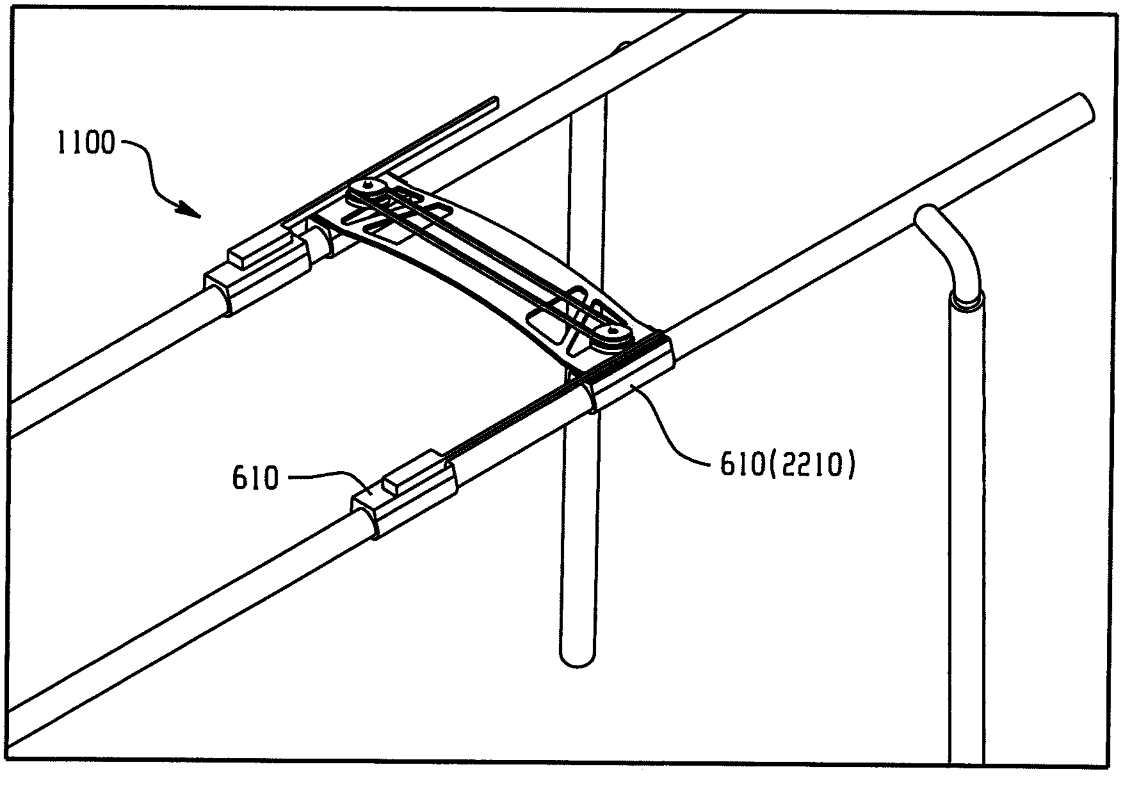
FIGS. 12A-C are illustrations of three additional reverse motion linkages.
Figure 12B:
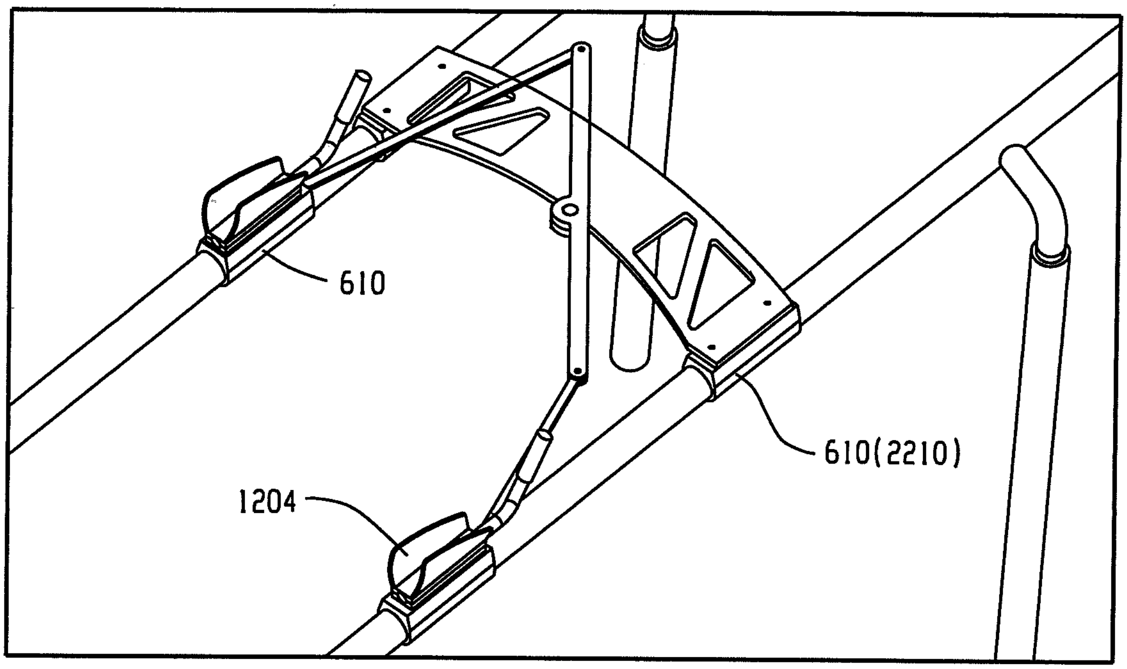
Figure 12C:
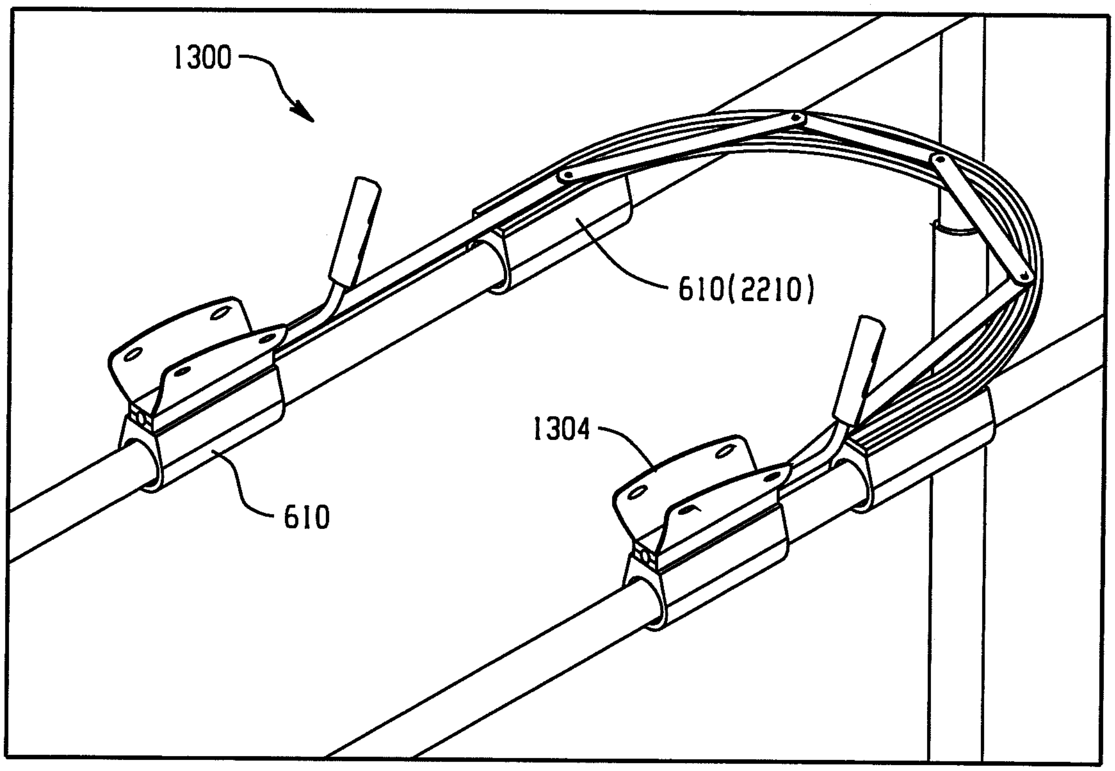
Figure 13A:
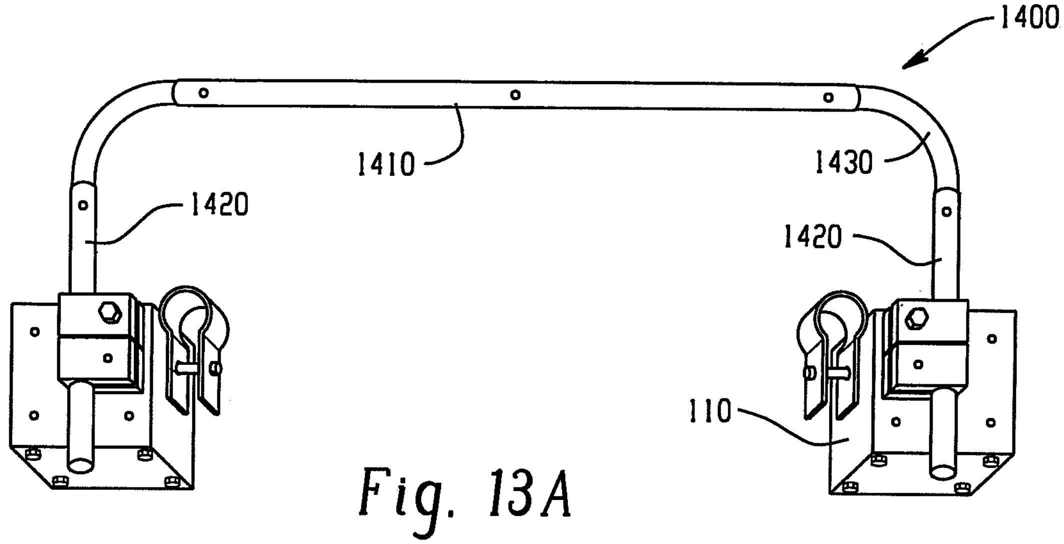
FIGS. 13A and 13B are images of a reciprocating motion linkage, shown secured to two rail linkage assemblies.
Figure 13B:
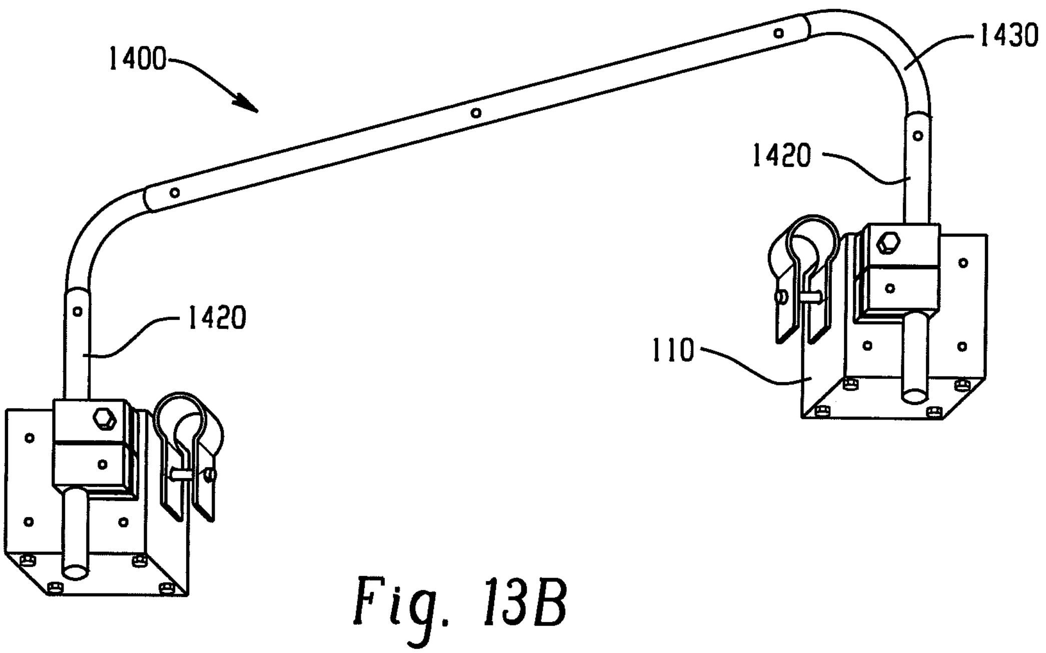

With reference to the accompanying FIGS. 10A-10D, there is shown an alternate rail linkage assembly 610 and alternate reverse motion linkage designs 1100, 1200, 1300 (FIGS. 12A-12C). In addition, a reciprocating motion linkage 1400 is illustrated in FIGS. 13A-13B; a reciprocating motion linkage 1500 in FIG. 14; a mobile patient aid assembly 1600 which includes forearm trough 1604 which glides along a track 1610 in FIG. 15A; a mobile patient aid assembly 1700 which includes a device 2310 onto which a support surface such as platform assembly 104 is attached and track 1710 (FIG. 15B); and mobile patient assemblies incorporating tracks with reverse motion linkages 1800 (FIG. 16A) and 1900 (FIG. 16B).

These are particularly useful for patients who exhibit upper extremity dysfunction which prevents the patient from using upper extremity support in the normal manner in railed devices and/or movement of the upper extremities during ambulation activities on these devices is desired. More particularly, these assemblies are adapted for use in connection with training and exercise such as for rehabilitation and also in connection with other medical, sports, or fitness settings. When two mobile patient aid assemblies are used, they can be linked with the cross bar linkage 500, the reverse motion linkage 200, 1100, 1200, or 1300 or the reciprocating motion linkage 1400 or 1500, or unlinked with or without incremental counterweights added to the assemblies to stabilize. Various support surfaces can be incorporated into devices made to be mobile by incorporation of track systems. The track systems and reverse motion linkages can be used during stationary activities such as walking on a treadmill or standing or marching in place. The additional types of support surfaces can be used with any device such as 110 or 610 which allows for mobile or stationary support when needed in railed environments. Moreover, any combination of the upper extremity support surfaces can be used, or a support surface may be used unilaterally even when rail linkage assemblies are connected via a linkage. In this latter case, the patient can grip the rail, or grip the rail linkage assembly itself which would be particularly feasible when using device 610 which is cylindrical in nature. The reciprocating and straight bar linkage 500 can also be used when standing/marching in place as well as when walking forwards or backwards, as in parallel bars. The supports, whether used unilaterally or bilaterally, can be used when walking forward or backward or for marching/walking in place or standing.

Figure 10A:
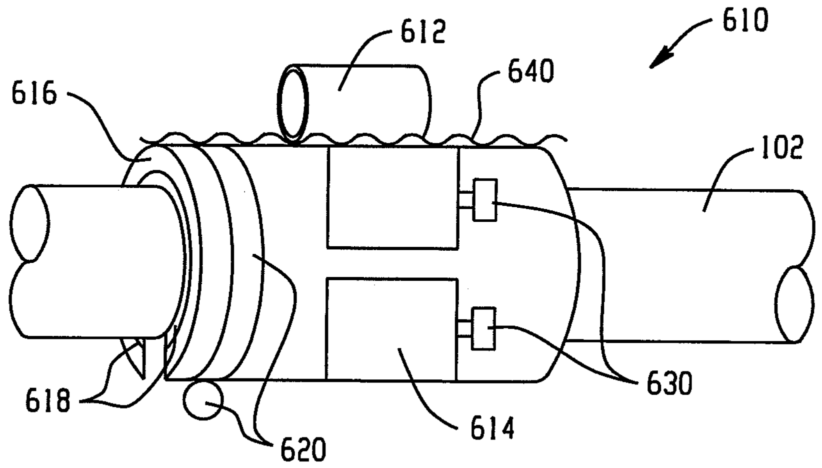
FIGS. 10A and 10B are illustrations of the side and cross sectional views, respectively, of an alternate rail linkage unit 610.
Figure 10B:
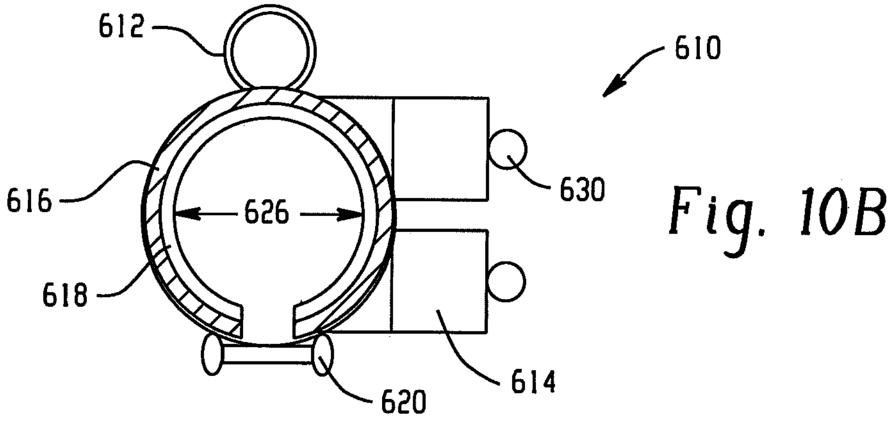

FIGS. 10A and 10B are side and cross sectional views of the alternate Rail Linkage Assembly 610 which is, for example, rigid member such as a cylindrical steel (or other metal, polymer, composite) tube of variable thickness 616, lined with a material that facilitates sliding movement relative to the rail/bar on which the assembly is mounted such as a self-lubricating polymer such as ultra high molecular weight polyethylene (UHMWPE) 618. The polymer is cut to be variable thickness and geometry (and hence cross-sectional shape when viewed following lining the cylinder with the layer of material and examining cross sectionally), such that it conforms to the rail onto which it will be attached and along which it will translate. Rail linkage assemblies with a collar fitting rails of variable shape other than round, will not freely rotate about the long axis of the rail; as such, vertical stability of the device will be inherent, and a mechanical linkage will likely not be needed for this purpose. The resultant inside profile or diameter of the device 626 is the same as or equal to the outside profile or diameter of the rail onto which it is attached, in the case of a round railing. The polymer can be backed with an adhesive and hence affixed to the internal surface of the cylindrical tube, or attached in other ways so as to enable exchanging and reusing collars readily. The plastic collar can be simply removed and replaced with an alternate collar, such that the rail linkage assembly can be used on an alternate rail if desired. For example, a slit is cut lengthwise along the cylinder and the assembly 610 is hinged 640 to enable opening such that the assembly can be opened and put on a rail and subsequently secured in place. A tube weldment 612 is located on the top (or other surface) of the device and receives and secures the linkage 500 (or any other of the linkages) in the same manner as was accomplished with rail linkage assembly 110. A fastener 620 serves to approximate the two separated edges of the cylinder and can be tightened or loosened in order to vary the amount of friction when the device moves relative to or glides along the rail. The fastening device can be of any design/configuration and one or more could be incorporated as needed to achieve friction adjustment of the device. It is also contemplated that instrumentation of the fastening device would be desirable to allow objective measures of resistance to movement hence incorporated. One or two tube clevises 614 are secured via welding or other means to one side of the device (attached medially in the Figures illustrated) and serve as the receptacle for the upright tube which is the attachment mechanism of the various upper extremity support assemblies. Tightening screws 630 serve as one option of a method to tighten the tube clevis around the tube. It is also contemplated that the collar and inner lining could be a single component, i.e., the lining integrally formed as a part of the tube such as a reinforced polymer collar that includes a lubricious material (or is inherently lubricious) to facilitate manufacture of the arrangement. Again, the present disclosure is intended to illustrate one preferred embodiment but is not deemed to be limited to only this embodiment.

Figure 10C:
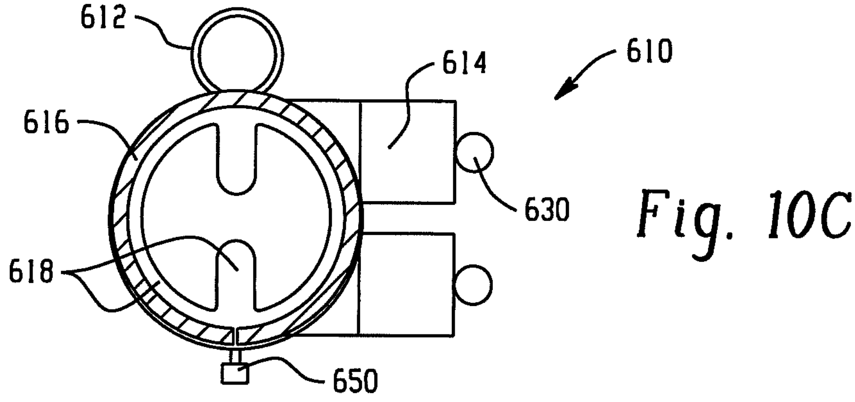
FIG. 10C is a cross sectional view of assembly, illustrating accommodation of such to a unique rail cross sectional shape used for illustrative purposes.
Figure 10D:
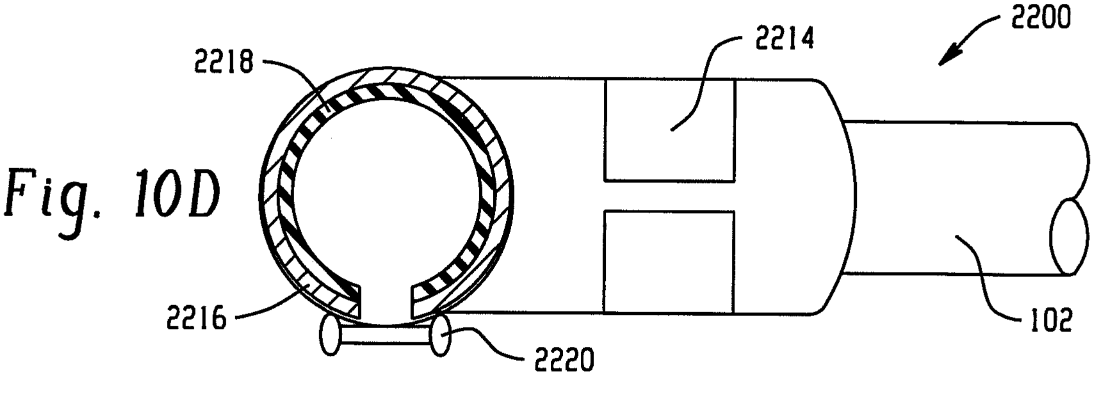
FIG. 10D is an angled side view of an alternate motion stoppage unit design 2210.

FIG. 10C is a cross sectional view of device 610 with a plastic lining (collar) with two projections which run longitudinally within the device, and which is fabricated to accommodate a railing of alternate shape (i.e., one with longitudinally-running grooves along the superior and inferior aspects). The same device 610 is lined in this example with a specified thickness of plastic, for example, which lines a portion of each hemisphere of the cylinder, and has projections (on the top and bottom in this example) which accommodate a railing with mirror image indentations. As is illustrated here, the device can be split and the two portions hinged to enable opening the device to put on a rail and subsequently secure with the fastening screw(s) 650 which simply secure the abutting edges of the cylinder assembly together as opposed to serving as a progressive tightening mechanism. Functionally, a device which conforms to a noncircular rail such as this would be inherently stable and a linkage serving to provide rotational stability of the device(s) on the railing(s) would likely not be needed. A reverse or reciprocating motion linkage could, of course, still be incorporated for purposes related to the functionalities thereof, as indicated for therapeutic, functional, exercise training, or other purposes and therefore an attachment site (such as a tube weldment 612 shown here) for such is needed.

A motion stop assembly 2210 (FIG. 10D) can be placed at variable distances on either side of rail linkage assemblies in order to delineate a prescribed translation range in a manner as described above. Reference numeral 2216 denotes the (variable) thickness of the tube. A compressible rubber (or other material) lines the device 2218, and when the device is secured in place by a fastener 2220, the device is not capable of translation and hence is stationary. Tube clevises 2214 may be included in order to use the assembly as a stationary support surface hence creating a stationary support surface 2200. The upper surface could be readily adapted with any of various attachment mechanisms to secure such things as components of linkage systems or mobile track systems to a specified location on the rail.

FIG. 11 shows linkage 200 in a parallel bar environment. Note that the upper extremity support surfaces have not yet been attached to enable use. When any of the reverse motion linkages (200, 1100, 1200, 1300) is used for standing activities working on arm movement, or walking on a treadmill, or marching in place, an immobile rail linkage device such as a motion stoppage block 2200 or other device which can serve as an attachment point for each end of the linkage member which spans the two rails (210), can be easily designed. Mobile units would be used for attachment of upper extremity support surfaces to enable arm movement. If one wants to walk forward or backward, however, mobile rail linkage assemblies such as 610 would be used throughout (four such assemblies in this example). The motion stoppage blocks can readily be equipped with a mechanism on the superior surface with which to secure the spanning member of the linkage, or the tracks discussed below.

FIGS. 12A, 12B, and 12C are different designs of reverse motion linkages. The linkage assemblies provide for reverse motion of the first and second rail linkage assemblies (and hence whatever support surface is attached thereto) when secured to parallel rails. Indeed, the movement of one rail linkage assembly in either direction can independently cause motion in the opposite direction of the opposite assembly. In FIG. 12A, the support surface has not yet been attached to rail linkage assembly 610; in FIGS. 12B and 12C, a forearm trough is attached directly to the top surface of the rail linkage assembly, hence creating mobile devices 1204 and 1304—a trough without adjustable vertical attachment pole. As the forearm trough is affixed directly to the rail linkage assembly, elevation of the railings such that the forearm can rest on the surface is necessitated. The spanning members are affixed to the rails by 610 or 2210 (mobile or stationary rail linkage assemblies). In FIG. 12A, the first and second rail linkage assemblies 610 each move relative to their respective rail, and each move relative to one another via and interconnecting flexible member such as a wire, cable, etc. received around one or more pulleys. Thus, as one of the rail linkage assemblies moves rearwardly, the other rail linkage assembly moves forwardly. In FIG. 12B, a different mechanism is shown. A three bar linkage assembly is shown that includes a central arm pivotally mounted to the cross member that extends between the first and second parallel bars. Opposite ends of the central arm are, in turn, pivotally connected to link arms that are connected at their distal end to respective slidable support portions of the rail linkage assembly. Again, in this way, the entire linkage assembly is able to move relative to the parallel bars (i.e., the cross member and support portions of the assembly, and each support portion, for example 1204, can move relative to its own rail and relative to the other support portion on the other rail. In FIG. 12C, still another variation of a rail linkage assembly is illustrated. Here, additional links or arms are pivotally connected to one another and to the support portions of the rail linkage assembly. A cable could also attach to the rail assemblies and travel along the U-shaped track. The cross member has a generally U-shape and includes a track or group that receives connection members or pins that join the individual links together, and partially constrain relative movement or orientation as the rail linkages move to and fro.

FIGS. 13A and 13B are images of a reciprocating linkage 1400. This includes a cross bar member 1410, and two lateral members 1420, each maintained in parallel configuration to each of the rails, and each being connected to the rail linkage assemblies 110 (as with a tube weldment or tube clevis or other securing mechanism) which are attached to the railings. Alternately, of course, assembly 610 could be incorporated instead of 110, or any other type of mobile device which is capable of translating along a rail and onto which a support surface and linkages and tracks can be attached. The cross bar member 1410 can easily be made width-adjustable to accommodate variable widths between railings. For example, aluminum tubing such as is pictured here can be fit with snap pins and holes to easily adjust overall tubing length. Any of several methods of joining each of the ends of 1410 with an end of each of the shorter sections 1420 can be used in order to create a hinge joint 1430. In this illustration is shown substantially thick rubber tubing which is inserted and secured within the ends of the tubing sections to be linked. As one side is moved forward, the other side can be made to move in the reverse direction with force exerted in the opposite direction by the opposite upper extremity and one can march/walk in place or can walk forward within the parallel bars with the arms moving in this manner. Alternately, as one side is advanced forward, e.g. right side as in FIG. 13B, the opposite (left) upper extremity/device remains stationary on the rail. Then, as one takes a step, the left upper extremity is then moved forward while the right side remains stationary.

Figure 14:
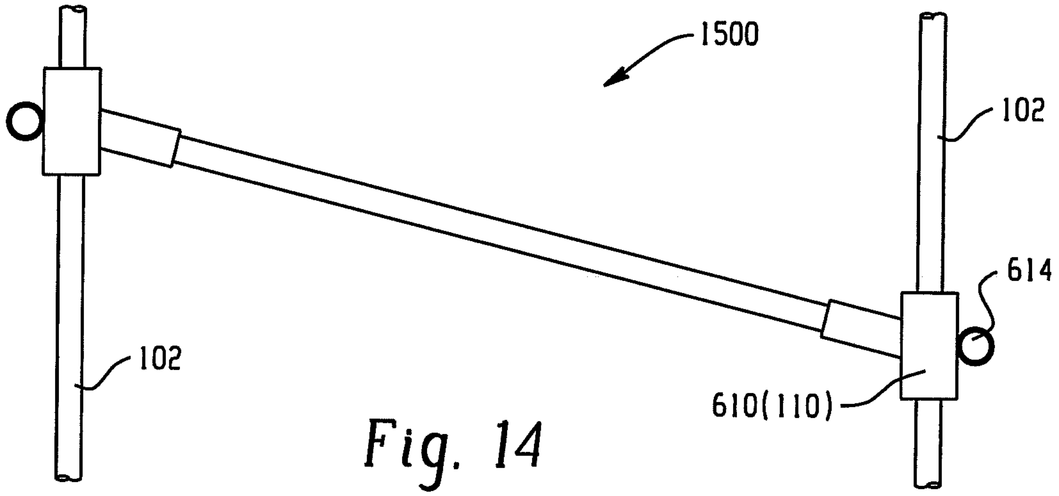
FIG. 14 is a view of another reciprocating motion linkage design, as seen in place between parallel rails and attached to two rail linkage assemblies.

Illustrated in FIG. 14 are sections of two parallel railings, each with a rail linkage assembly (610 in this case, although 110 could also be incorporated). The assemblies are interconnected with a reciprocating motion linkage 1500. The linkage is secured to the top or medial surface of the device, for example. This linkage functions as follows. With adequate UE function bilaterally, as one arm pulls back, the other arm is pushed forward, and this can be done while standing in place or while moving forward or backward along the rails. The spring-loaded device (that may include a pair of telescoping tubes that contain a biasing spring) becomes shorter as the two assemblies are positioned more directly opposite each other, and lengthens as they are moved farther along the rails in opposite directions. Alternately, one device can be kept stationary while the device on the opposite rail is advanced forward; the device just translated along the rail is then held in position while the other device is moved forward. Hence, utilization of the linkage in this manner results in independent sequential movement of assemblies along the rail. Gait training endeavors using the linkage in either manner would conceivably include moving the opposite lower extremity with the arm, hence creating the desirable reciprocating gait pattern.

Figure 15A:
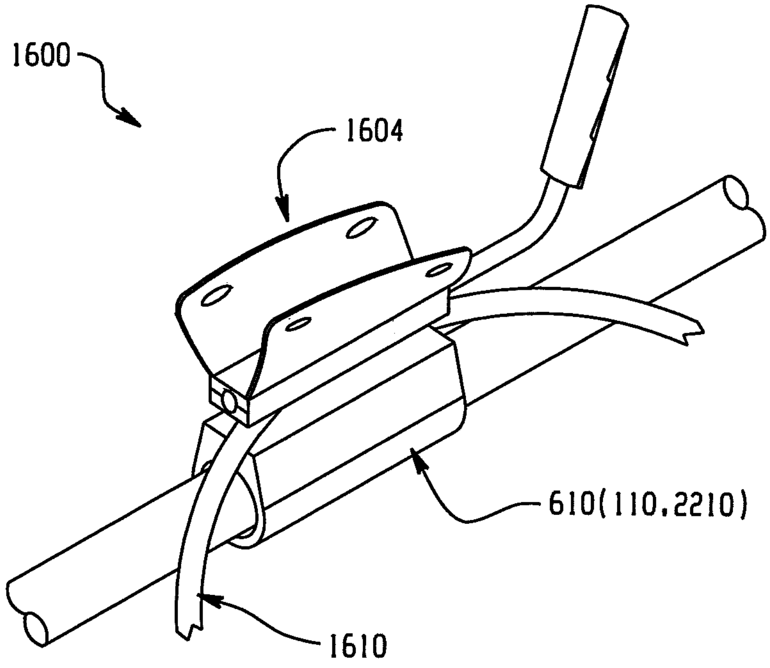
FIGS. 15A and 15B are illustrations of mobile upper extremity support systems utilizing tracks.
Figure 15B:
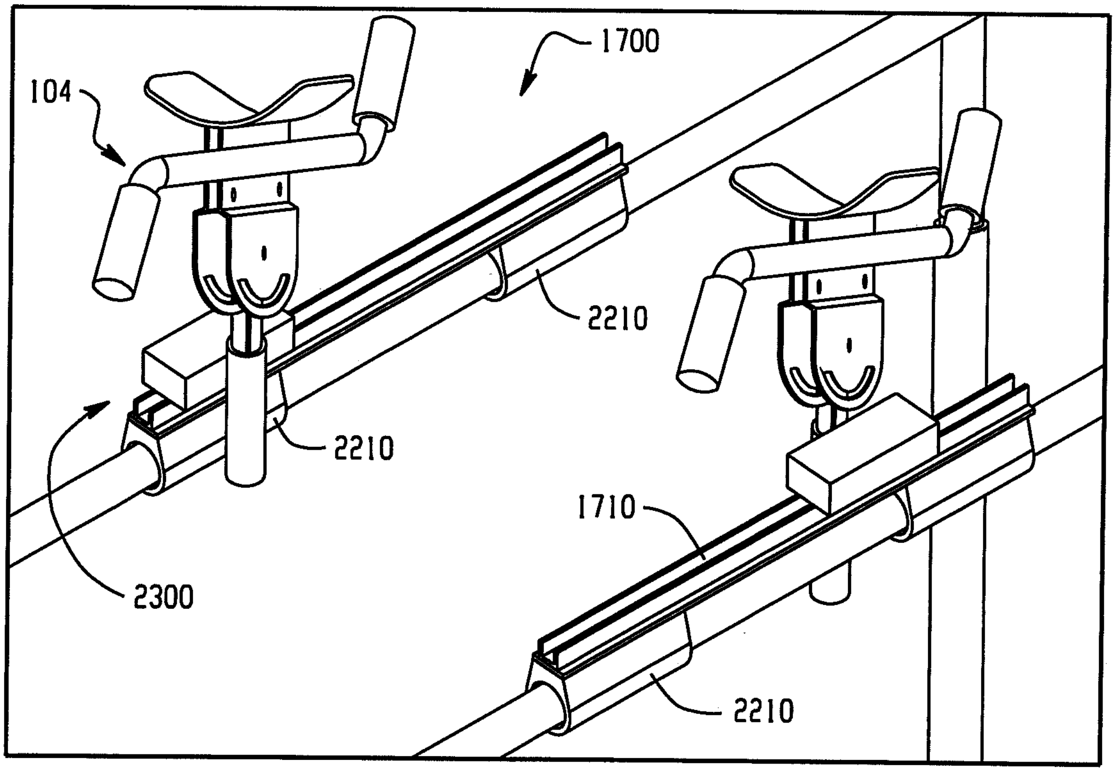
Figure 16A:
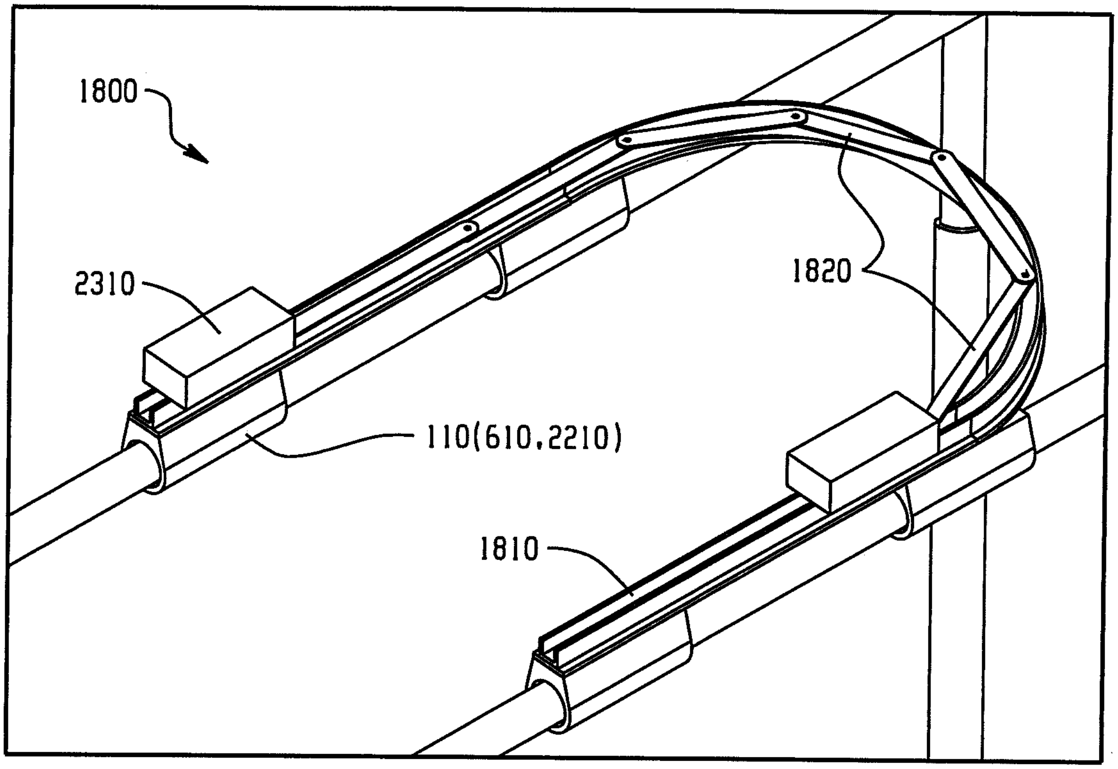
FIGS. 16A and 16B are designs of two continuous track systems, incorporating a reverse motion linkage.
Figure 16B:
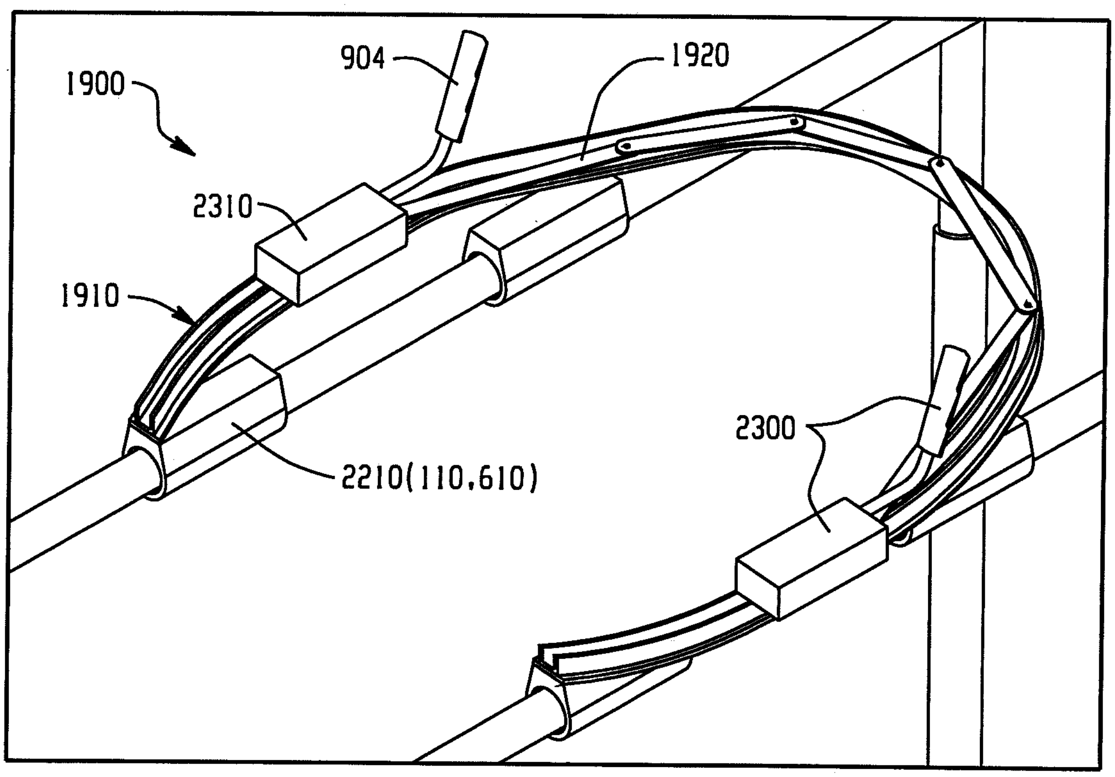

An alternate manner to accomplish mobile upper extremity support in railed environments is as follows, and as is illustrated in FIGS. 15A and 15B. A support surface such as a forearm platform assembly (104, as shown in FIG. 15B) or cane handle/grip (904) can be readily attached to a device (2310) which stably glides along a track (1610 or 1710 for example), hence creating mobile support surface 2300. Alternately, as in FIG. 15A, an undersurface of a forearm trough 1604 is equipped with rollers, bearings, or any of several other mechanisms to accomplish secure mobility (i.e., relative sliding) along a track. The track 1610 is curvilinear which enables more movement of the upper extremity in the transverse plane as occurs when the arm swings naturally, as compared to straight sagittal plane movement which is facilitated with use of track(s) 1710 as in FIG. 15B. Either of these tracks can be used unilaterally or bilaterally with immobilized rail linkage assemblies 110/610 or device 2210 which serves to stably position the tracks in a selected position along the rails for stationary activities. For stationary activities, indeed, incorporation of the simpler device 2210 would be preferable to a mobile rail linkage assembly 110 or 610. Alternately, the reciprocating or reverse motion linkages could be incorporated with 1600 hence necessarily using mobile rail linkage devices 110 or 610, which would allow one to walk forward or backward between parallel bars, working on moving the arms at the same time in various ways as allowed by the various linkages and in combination with the increased transverse motion related to shoulder rotation enabled by 1600. As pictured in FIG. 15A, the device is used unilaterally within a stationary or mobile fashion; in FIG. 15B, bilateral platform support is used for activities such as standing or marching in place, or with treadmill surface between the rails.

Mobile upper extremity supports that include device 2310 and any of the upper extremity support surfaces can be used bilaterally and linked with a reverse motion linkage. Two exemplary configurations are presented in FIG. 16A and FIG. 16B. Support surfaces have not been added for ease of illustration and simplification purposes in FIG. 16A. Reverse motion linkage assembly 1800 functions as follows: The track (1810) is secured to both rails, by two or more (four shown here) assemblies 110, 610, 2210. Piece 2310 glides along the track and provides the surface to which the various upper extremity support surfaces are attached. A cable is connected to each of the two pieces 2310 and is securely mobilized through a housing which is or rests on a spanning member. Alternately, another connection between the assemblies 2310 is envisioned, via mobile components contained within or along the track. As other reverse motion linkages accomplish, movement of a weak limb can be potentiated by a stronger limb, for example. In FIG. 16B, the track 1910 is curved such that greater degrees of freedom of movement of the shoulder can be accomplished as the tracks along which piece 2310 moves are curved in the transverse plane. Cane handles/grips (such as 904, attached via upright tube secured in tube clevis on side of 2300) are shown in this example. In either case, the entire assembly can be mobile, hence necessitating use of rail linkage assemblies 110 or 610 which would provide a support surface for the track, or alternately the assembly can be securely positioned on the rails either by securing rail linkage assemblies or using the more simple device 2210 (four such devices are incorporated with this design, although it is understood that more attachment points to the rails may be needed). One skilled in the art will recognize that these are merely illustrative of a wide range of linkage assemblies, track assemblies, etc. that may be used to accomplish desired movement of the upper extremities in supported relation relative to one bar or relative to a pair of parallel bars, whether the patient remains relatively stationary between the parallel bars (i.e., walks in place while reciprocating our motion is permitted via movement of the linkage assemblies relative to a respective support bar) or whether the entire linkage assembly traverses along the length of the parallel bars.

A method to create an articulating member for use by above-elbow amputees with a mobile forearm platform support is also envisioned A roughly shaped upper extremity prosthesis includes a humerus (upper arm), 90 degree “elbow joint”, and forearm with distal component either resembling a hand or which simply enables securing to the handle portion of a platform assembly. Sections of the proximal end of the humerus can be removed or kept in place as needed to accommodate the length of the residual limb such as by simple latching mechanisms. An elastic sleeve serves to create a cavity akin to a synovial cavity, placed over the end of the residual limb and over the proximal end of the prosthesis. This arrangement enables the above elbow amputee to readily and comfortably use a mobile forearm support for weight bearing as needed through the upper limb, or variably to encourage arm swinging motion which is important for functional restoration of both upper and lower extremity function. The proximal ends of the prosthesis can be padded and shaped for fit and comfort, particularly as needed to enable weight bearing through the limb. The elastic orthosis securely keeps the articulating surfaces in close approximation. One can envision various sizes (such as S-M-L-XL) of orthotic sleeves as well as of prosthetic component. The method and device would use a solid rough form of a prosthesis affixed solidly to a cane grip and positioned so as to accept vertical forces. As accomplished for the above elbow amputee, sliced sections of wrist and mid- to distal forearm can be added to whatever extent is needed in order to accommodate a residual limb with goal to approximate the length of the uninvolved UE. An elastic sleeve circumferentially encompasses the residual limb on one end and the proximal end of the prosthesis and securely keeps the surfaces closely approximated such that weight bearing through the limb, as well as stable or mobile positioning thereof, can be achieved. Device is shown with mobile platform unit 100 and device 2100 is shown with mobile cane grip unit 900.

Figure 17:
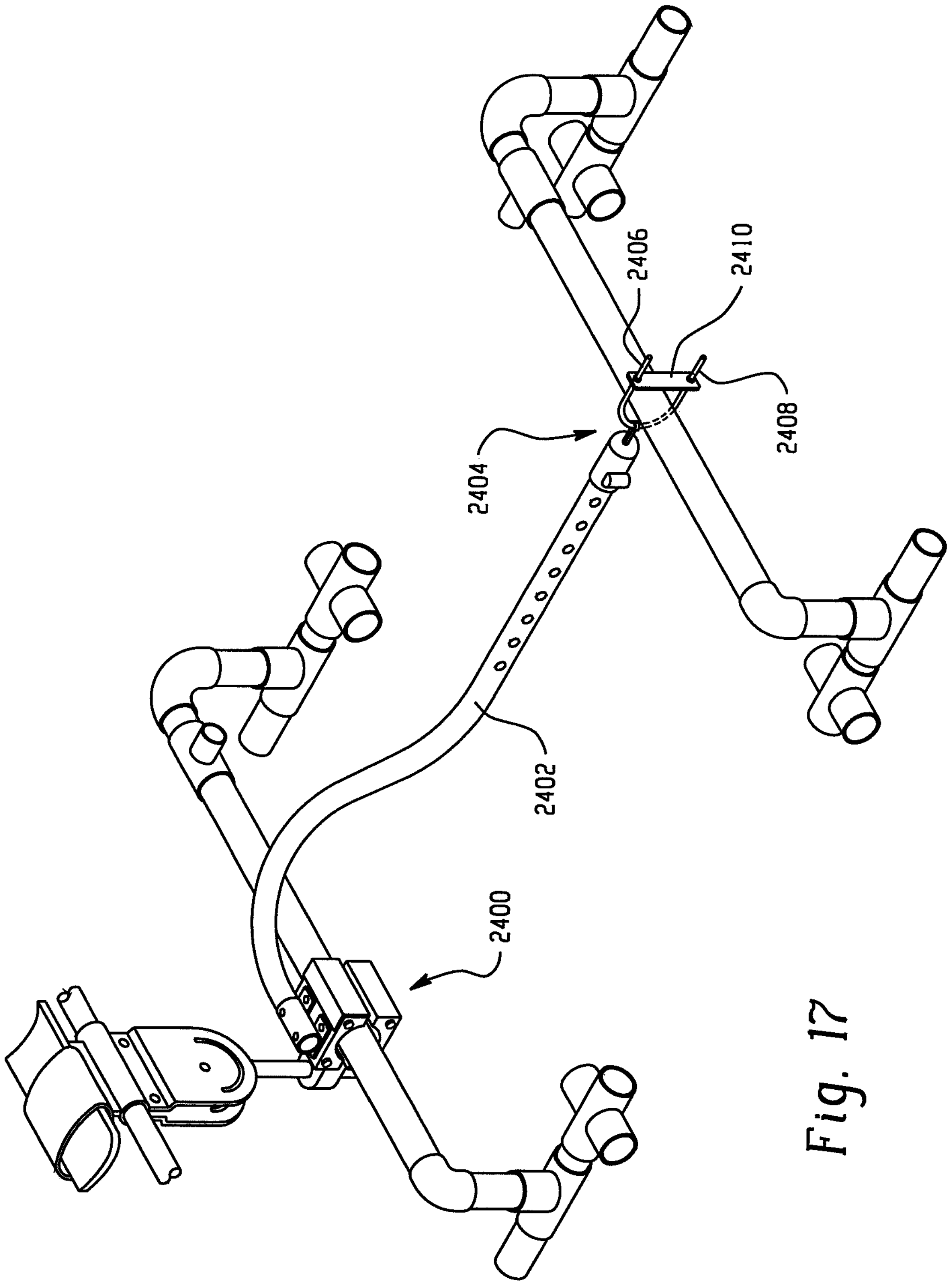
FIG. 17 shows a slider assembly for receipt on a rail and a lower support rail that cooperates therewith to prevent undesired rotation of the slider assembly.

FIG. 17 shows another arrangement in which additional stability for the support assembly is achieved by providing a bifurcated or forked support that extends over one of the rails. As shown, a mobile support member or mount 2400 is shown on the left-hand rail. As described above, the support member 2400 may include any one of a variety of supports for the affected UE. For example, a forearm support or platform may be mounted to the support member 2400, or a grip, etc. Here, a cross linkage member 2402 extends from the support member 2400 toward the other rail (the right hand rail as illustrated). Adjacent the second rail, the end of the cross linkage member 2402 includes a bifurcated structure 2404 that is shown as a forked assembly received for sliding engagement relative to the second rail. Particularly, the forked assembly 2404 has a first or upper member 2406 that slides along an upper surface of the second rail and similarly a second or lower member 2408 that slides along a lower surface thereof. Further, a closure member 2410 may be provided along an outer region of the rail and extends across the upper and lower members in interconnecting fashion. By substantially surrounding the second rail, the cross linkage member 2402 provides increased stability to the support member 2400 on the opposite rail, namely, increased stability against rotation. Moreover, this is achieved without exerting undue drag or resistance on the mobile support member 2400.

FIGS. 18 *a*-18 F illustrate a glider concept for a support member 2500. A planar upper surface 2502 of the support member 2500 is maintained in a desired horizontal relationship by using multiple wheels or rollers 2504, shown here as three grooved wheels received around circumferential portions of the rail. Here, two of the wheels 2504*a*, 2504*b* are configured to roll along an upper surface of the rail while the third wheel 2504*c* is configured for rolling engagement along a lower surface of the rail generally opposite the other two wheels. At least one of the wheels, shown here as the third wheel 2504*c*, is selectively movable via handle 2506 that uses a spring force to hold the third wheel against the rail. An opening 2510 in the housing that forms a portion of the support member 2500 in conjunction with a spring 2512 holds the third wheel in either a biased open or biased closed position. FIGS. 18B-D illustrate the sequential steps involved in mounting the support member 2500 to the rail, and bringing the third wheel 2504*c* into engagement with the underside of the rail. FIG. 18E illustrates a lower support rail 2520 that is interconnected to the housing that forms the support member 2500. A grooved interconnection member 2522 is partially received in the housing of the support member 2500, and partially received in operative engagement with a bearing slider 2524 (FIG. 18F) received in the lower support rail 2520. Of course other interconnection may be used; however, the lower support rail 2520 prevents undesired roll or rotation of the support member 2500 relative to the rail.

Figure 19:
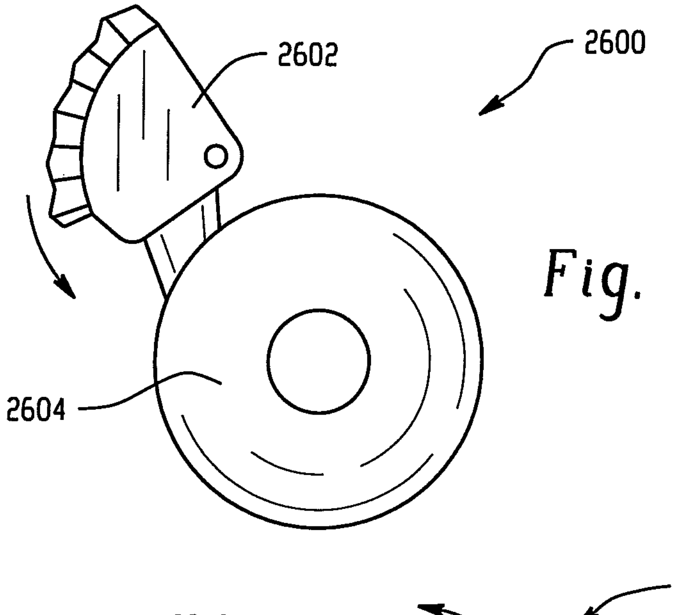
FIGS. 19-24 illustrate still other brake concepts.
Figure 20:
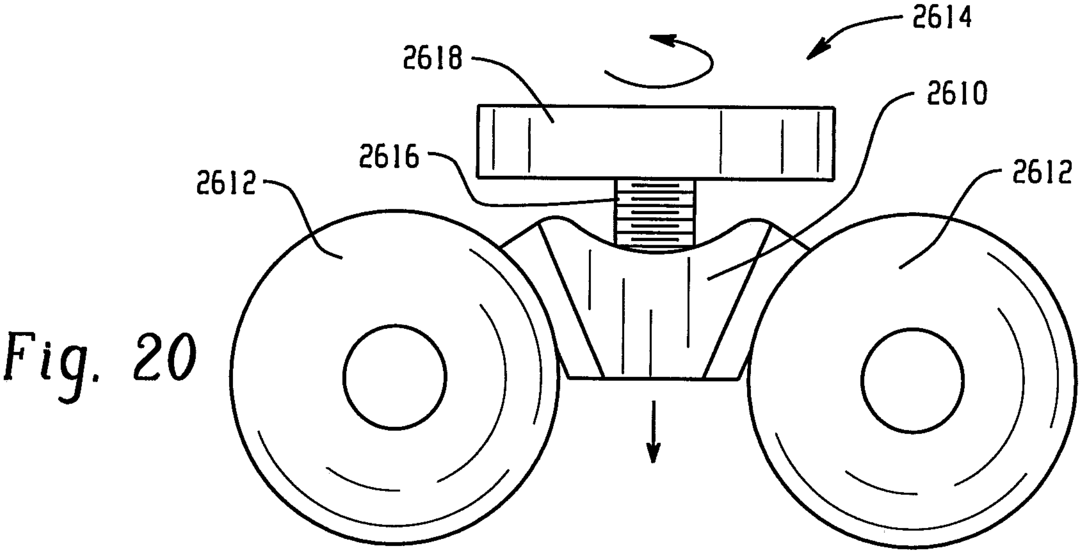
Figure 21:
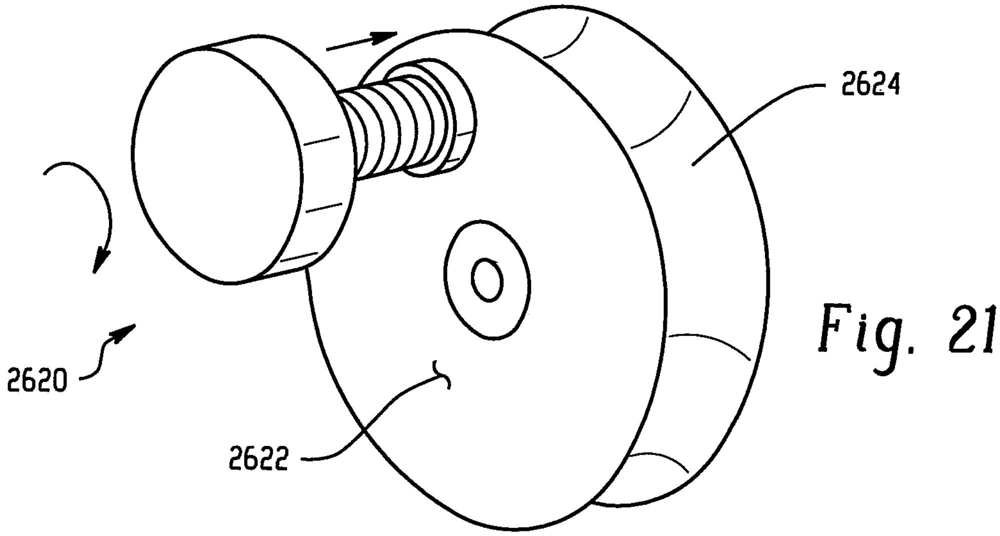

FIGS. 19-21 illustrate different brake concepts that can be used to lock a mobile support member 2600 relative to its associated rail. In FIG. 19, a rubber stopper 2602 is selectively pressed into the groove of one of the wheels 2604 (for example, of the type shown and described in FIGS. 18A-D). In FIG. 19, the rubber stopper 2602 is selectively pressed radially into the groove of the wheel 2604 and can be actuated by a conventional hand brake actuator (not shown). FIG. 20 advances and retracts a wedge shaped member 2610 to selectively engage two of the wheels 2612. An actuator 2614, such as a threaded member 2616 with an actuating handle 2618, is mounted to the support member 2600 and selectively advances and retracts the wedge shaped member 2610. FIG. 21 is a friction type stop 2620 that allows for fast, independent, and variable resistance to be applied to a surface 2622 of one or more the wheels 2624.

Figure 18A:
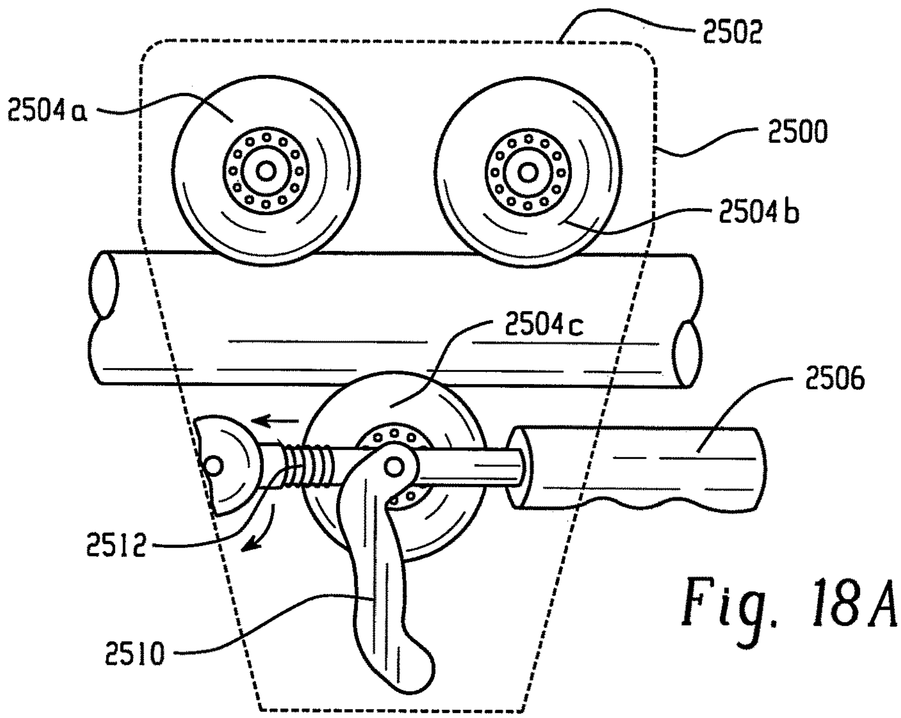
FIGS. 18A-18F illustrate different brake concepts.
Figure 18B:
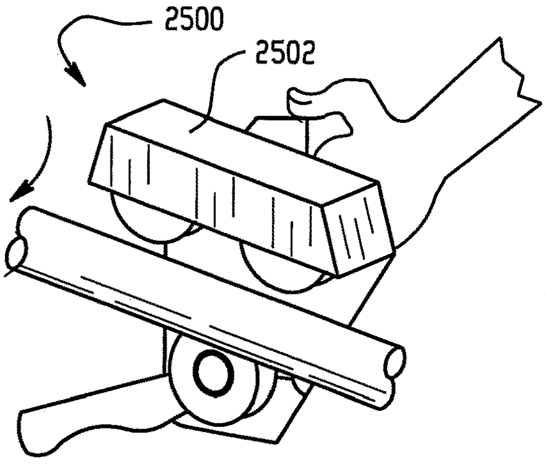
Figure 18C:
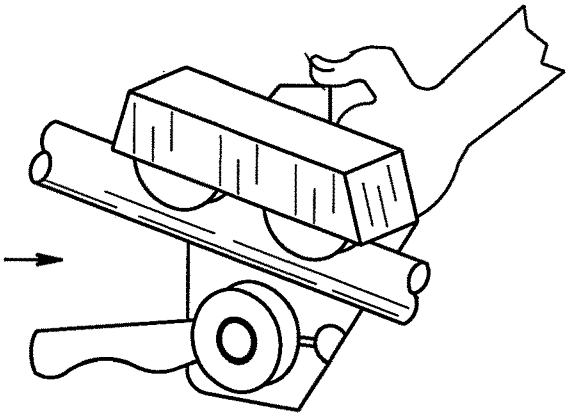
Figure 18D:
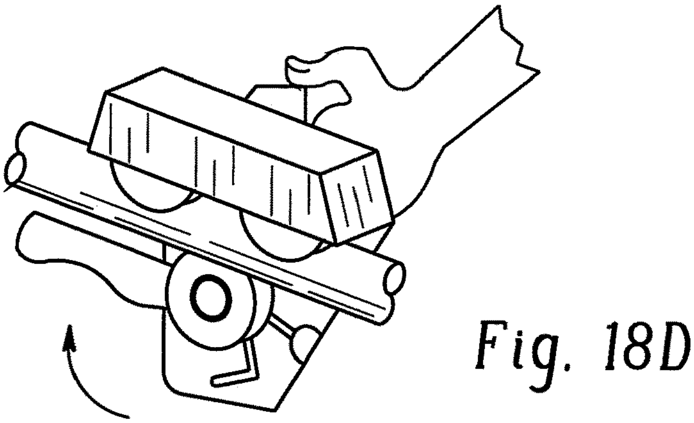
Figure 18E:
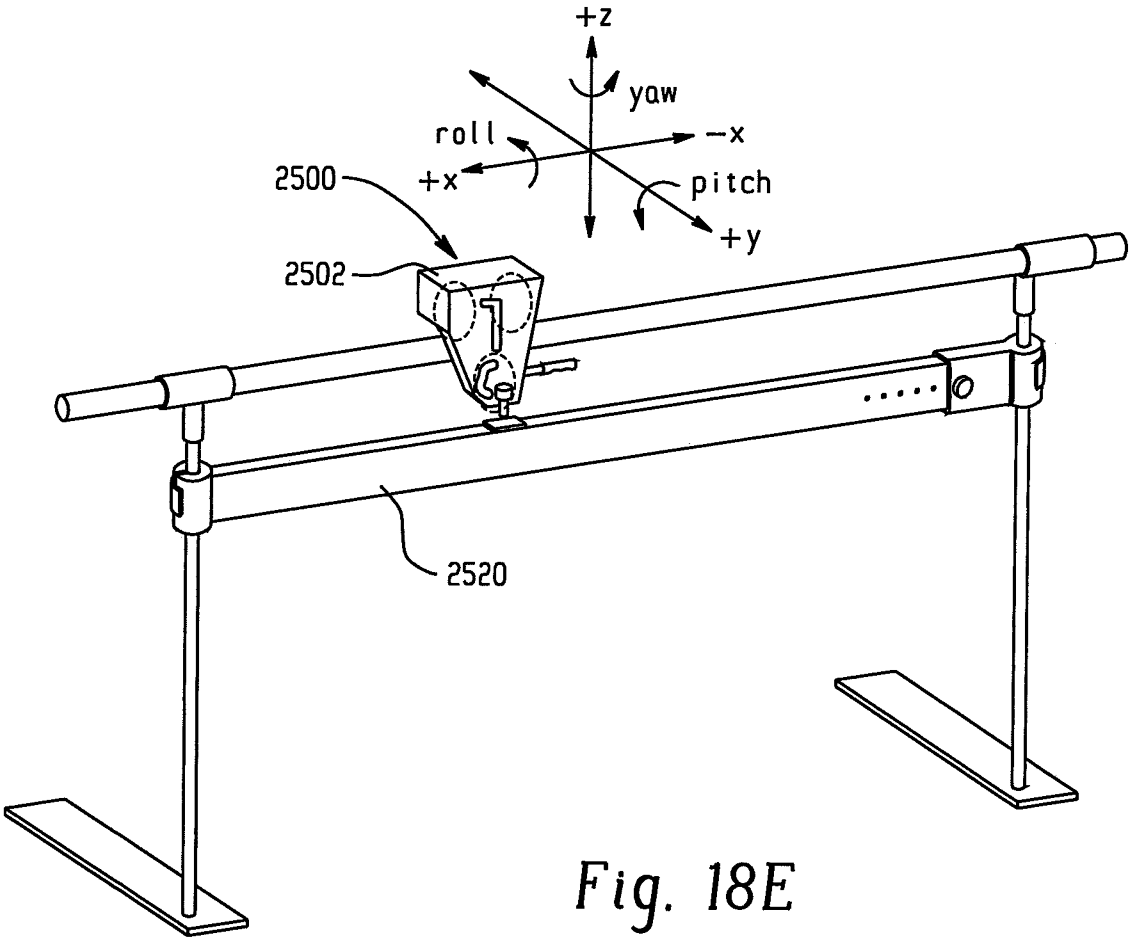
Figure 18F:
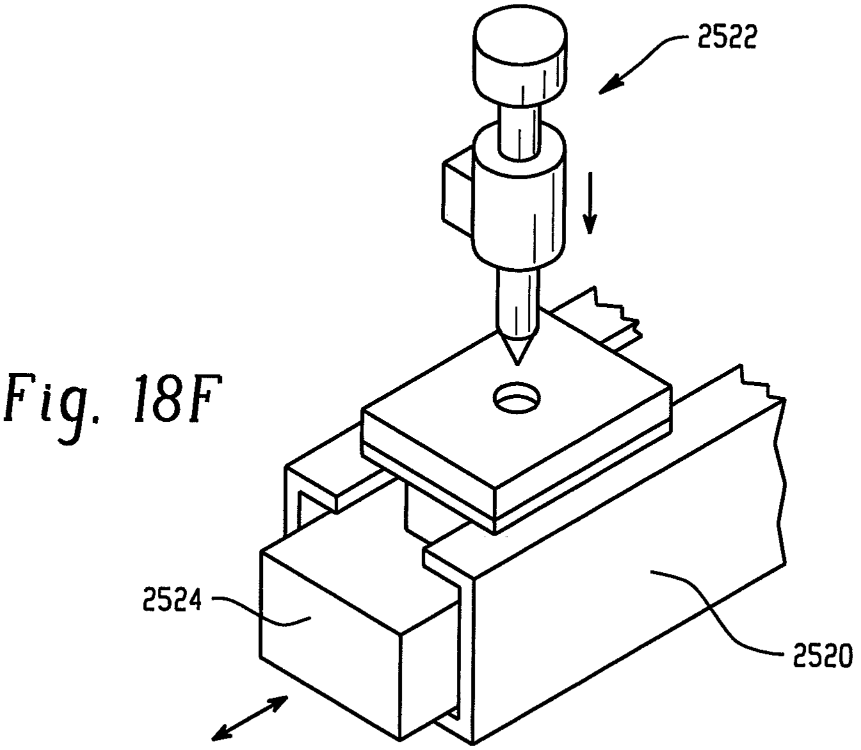
Figure 22:
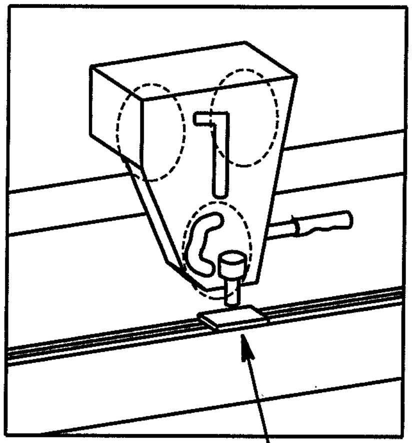
Figure 23:
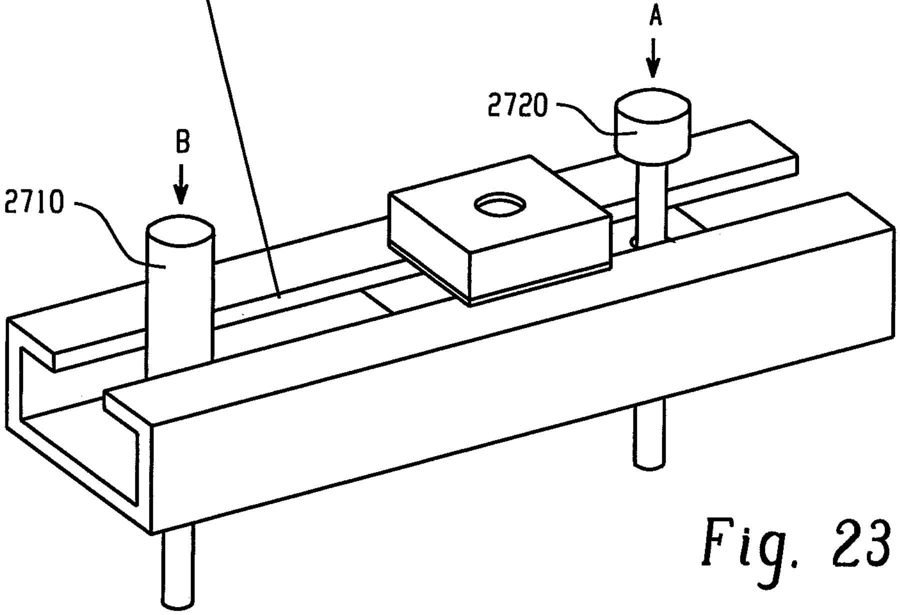
Figure 24:
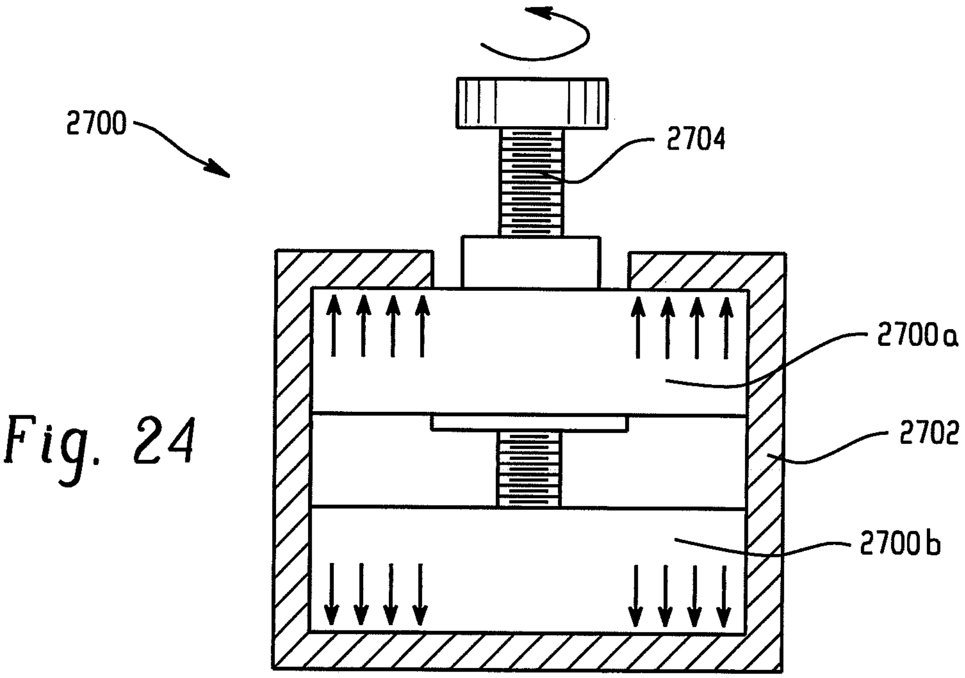
Figure 26:
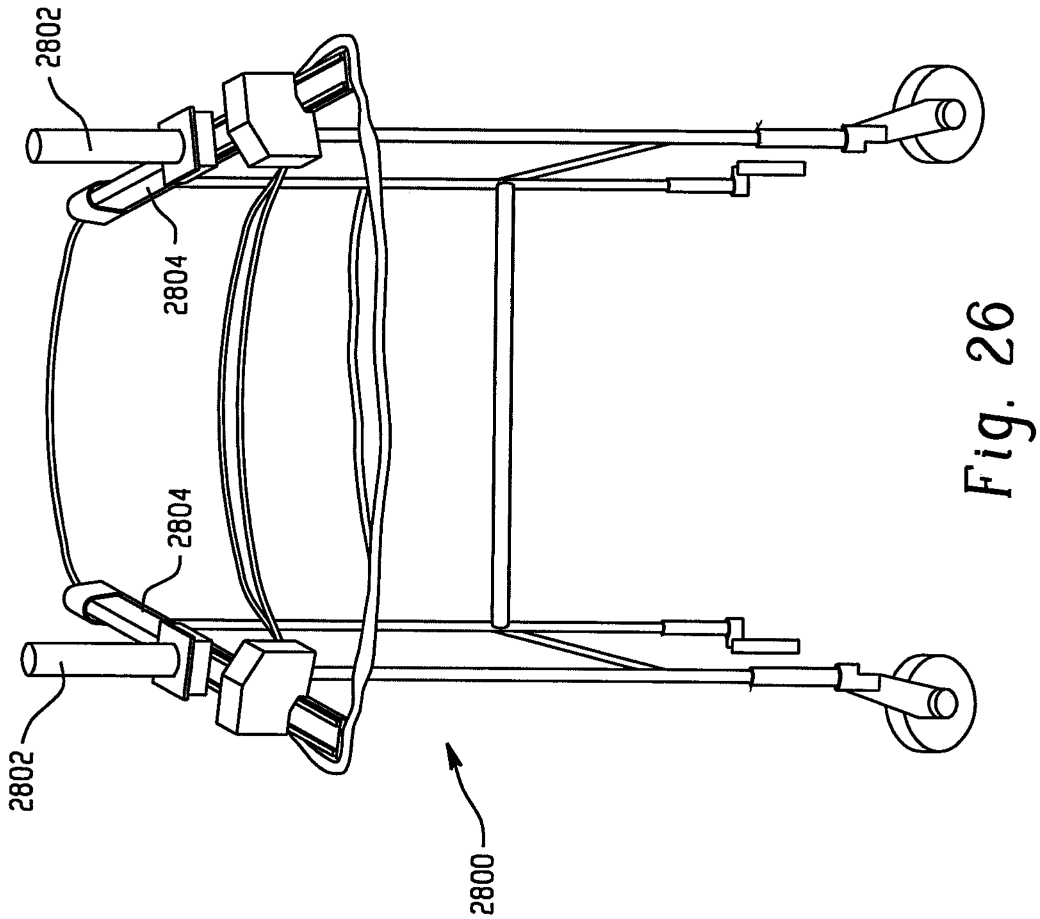
FIGS. 25-27 illustrate these features on a walker that allows selective reciprocating movement of the patient's arms in a normal gait.
Figure 25:
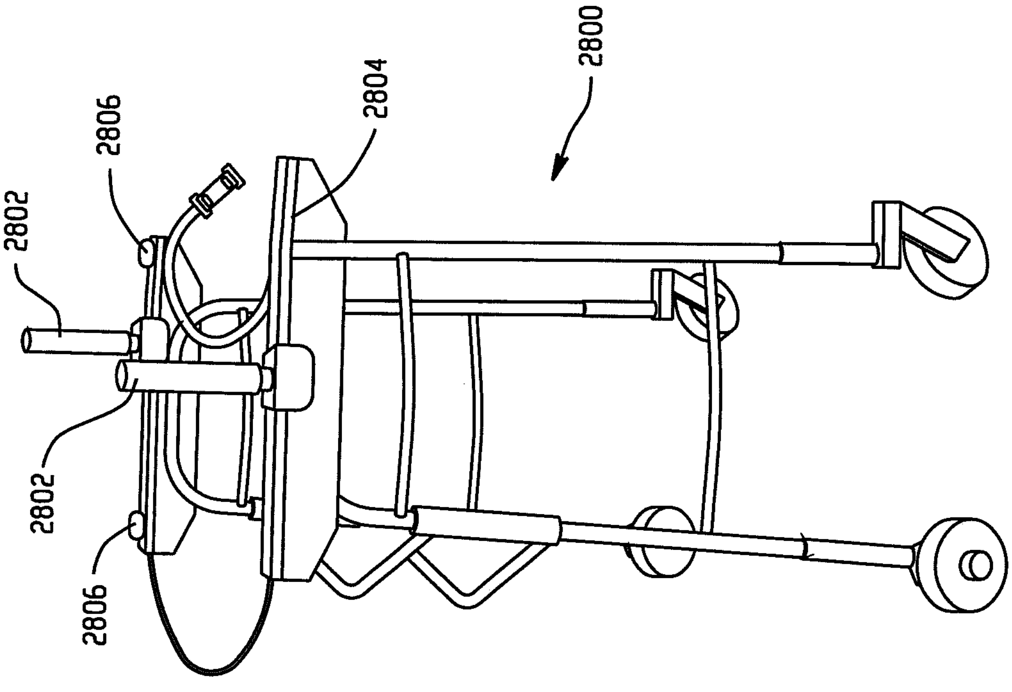
Figure 27:
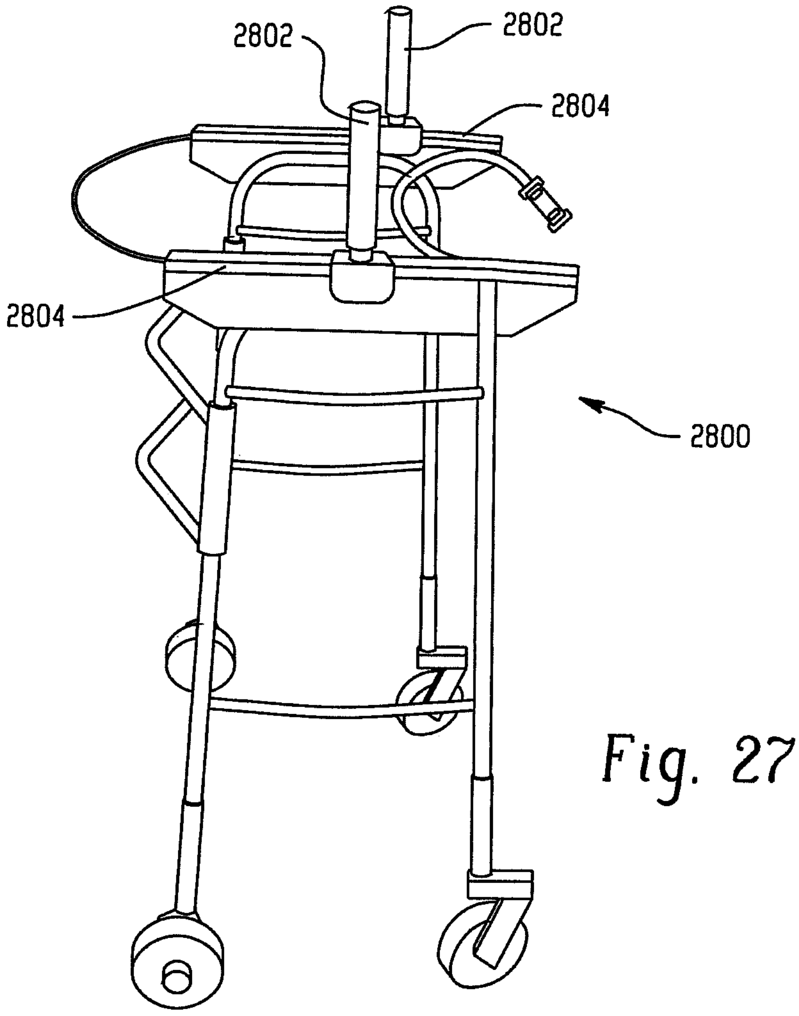

FIGS. 22-24 expands upon the bearing slider assembly of FIG. 18F to provide for variable resistance. As seen in FIG. 24, the bearing slider 2700 is a split assembly received in the lower support rail 2702. A threaded shaft 2704 selectively expands and retracts the first and second portions 2700*a*, 2700*b* of the bearing slider assembly 2700 into abutting, resistive engagement with interior surfaces of the support rail 2702. In addition, pegs or stop members 2710 may be selectively positioned at desired axial locations on the lower support rail to define stops that limit the range of axial movement of the mobile support member along the rail (FIG. 23). Likewise, similar pegs or rods 2720 can be used to fix the mobile support assembly relative to the rail/lower support rail and preclude relative movement of the mobile support member until the peg/rod 2720 is released.

Figure 28A:
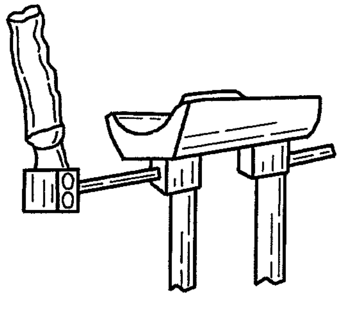
FIGS. 28A-28C show different handles, grips, or orthoses to grip/support the user when using the walker
Figure 28B:
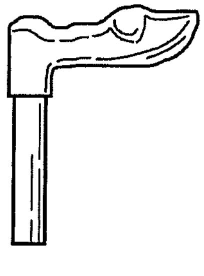
Figure 28C:
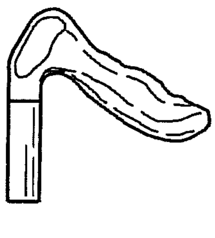

Shown in FIGS. 25-28 are front and side views of a walker 2800 that includes a rail structure for supporting mobile upper body supports on opposite sides of the walker. The support members 2802*a*, 2802*b* are adapted for fore and aft movement along respective tracks 2804*a*, 2804*b*. As one support member moves forward, the other support member moves rearwardly. In much the same manner as shown and described in connection with FIGS. 11-13, the support members are connected to one another for reciprocating movement. Thus, the support members are reversible support members that allow swinging arm movement (reciprocating, reverse motion) as the patient advances with the walker. Stops 2806 may also be provided to limit the extent of fore and aft movement of each support member 2802. FIGS. 28 A-C illustrate that various supports or grips can be secured to a respective support member. This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

I claim:

1. An assembly for a railed device having first and second associated rails in parallel relation, the assembly comprising:

first and second housings configured for attaching and for slidingly engaging the associated first and second rails, respectively;

first and second upper extremity support assemblies connected to the first and second housings, respectively, for supporting associated first and second upper extremities of an associated user while the associated user is positioned between the parallel, associated first and second rails;

an interconnecting member joining the first and second upper extremity support assemblies and configured to create equal movement in opposite directions of the first and second upper extremity support assemblies relative to one another in a longitudinal direction; and a cross member positioned between the associated first and second rails for receiving the interconnecting member, the cross member mounted on third and fourth housings configured for attaching to and for slidingly engaging the first and second rails, respectively.

2. An assembly for a railed device having first and second rails in parallel relation, the assembly comprising:

first and second housings each having a surface that slidingly engages one of the first and second rails, respectively;

first and second upper extremity support assemblies connected to the first and second housings, respectively, for supporting associated first and second upper extremities of an associated user while the associated user is positioned between the parallel, first and second rails; and an interconnecting member operatively joined to the first and second upper extremity support assemblies and configured to create equal movement in opposite directions of the first and second upper extremity support assemblies relative to one another in a longitudinal direction, wherein the interconnecting member includes one of a hinge or pivot between the first and second upper extremity support assemblies.

3. The assembly of claim 2 wherein the interconnecting member includes a linkage having a first arm secured to the first upper extremity support assembly and a second arm secured to the second upper extremity support assembly.

4. The assembly of claim 3 wherein the first arm includes an elongated slot allowing sliding movement of the first arm relative to the first housing, and the second arm includes an elongated slot allowing sliding movement of the second arm relative to the second housing.

5. The assembly of claim 2 wherein the interconnecting member includes a cross member dimensioned for receipt between the associated first and second rails.

6. The assembly of claim 2 wherein the interconnecting member includes a generally U-shaped track that receives at least portions of at least first and second arms operatively engaging the first and second upper extremity support assemblies, respectively and forming a linkage that cooperates with the generally U-shaped track.

7. The assembly of claim 6 wherein the linkage includes at least one additional arm interposed between the first arm and the second arm.

8. The assembly of claim 7 wherein the linkage arms slide in the generally U-shaped track.

9. The assembly of claim 3 wherein a second end of the first arm is fixed to a second end of the second arm.

10. The assembly of claim 9 wherein the joined second ends of the first arm and second arm pivot relative to the interconnecting member that includes a cross member dimensioned for receipt between the associated first and second rails.

11. The assembly of claim 3 wherein a second end of the first arm is pinned to a first end of an intermediate, third arm, and a second end of the second arm is pinned to a second end of the intermediate, third arm.

12. The assembly of claim 11 wherein the intermediate, third arm is joined for pivoting movement relative to the interconnecting member that includes a cross member dimensioned for receipt between the associated first and second rails.

13. An assembly for a an railed device having first and second rails in parallel relation, the assembly comprising:

first and second housings each having a surface that slidingly engages one of the first and second rails, respectively;

first and second upper extremity support assemblies operatively associated with the first and second housings, respectively, for supporting associated first and second upper extremities of an associated user while the associated user is positioned upright between the parallel, first and second rails for stationary activities or or for ambulating in a longitudinal direction generally parallel to the rails, wherein the upper extremity support assemblies include one of the following:

(i) a grip handle/gripping surface on each of the first and second housings configured for gripping by an associated user, or (ii) a forearm support assembly on each of the first and second housings configured for receiving at least a portion of respective first and second forearms of an associated user, or (iii) a grip handle/gripping surface on the first housing and a forearm support on the second housing; and an interconnecting member joining the first and second upper extremity support assemblies and configured to create equal movement in opposite directions of the first and second upper extremity support assemblies relative to one another in a longitudinal direction.

14. The assembly of claim 13 wherein the interconnecting member is a flexible member joined to the first and second support assemblies.

* * * * *